United States Patent [19]

Chouinard et al.

[11] Patent Number: 4,917,451
[45] Date of Patent: Apr. 17, 1990

[54] WAVEGUIDE STRUCTURE USING POTASSIUM TITANYL PHOSPHATE

[75] Inventors: Michael P. Chouinard; Edward P. Gargiulo; James L. Hohman, Jr.; Daniel B. Laubacher; Jiunn-Yau Liou; Moshe Oren, all of Wilmington, Del.

[73] Assignee: E. I. DuPont De Nemours and Company, Wilmington, Del.

[21] Appl. No.: 145,852

[22] Filed: Jan. 19, 1988

[51] Int. Cl.$^4$ .................................. G02B 6/10
[52] U.S. Cl. ........................... 350/96.14; 350/96.17; 350/96.20; 350/96.23
[58] Field of Search ............... 350/96.20, 96.21, 96.23, 350/96.17, 96.14

[56] References Cited

U.S. PATENT DOCUMENTS

| | | | |
|---|---|---|---|
| 3,837,827 | 9/1974 | Carruthers et al. | 65/30 |
| 3,840,889 | 10/1974 | O'Brien et al. | 357/81 |
| 3,864,018 | 2/1975 | Miller | 350/96 C |
| 3,909,108 | 9/1975 | Taylor | 350/96 |
| 3,928,102 | 12/1975 | Rowe et al. | 156/158 |
| 3,938,895 | 2/1976 | Bridger et al. | 356/152 |
| 4,012,113 | 3/1977 | Kogelnik | 350/96 C |
| 4,030,811 | 6/1977 | Khoe et al. | 350/96 |
| 4,035,058 | 7/1977 | Papuchon | 350/96 C |
| 4,048,591 | 9/1977 | Auracher | 332/7.51 |
| 4,070,094 | 1/1978 | Martin | 350/96 |
| 4,080,244 | 3/1978 | Auracher et al. | 156/630 |
| 4,087,315 | 5/1978 | Auracher et al. | 156/656 |
| 4,100,313 | 7/1978 | Hammer et al. | 427/162 |
| 4,136,439 | 1/1979 | Auracher et al. | 29/624 |
| 4,157,860 | 6/1979 | Marcatili | 350/96.14 |
| 4,186,994 | 2/1980 | Denkin et al. | 350/96.17 |
| 4,189,206 | 2/1980 | Terai et al. | 350/96.20 |
| 4,196,963 | 4/1980 | Chen et al. | 350/96.12 |
| 4,198,116 | 4/1980 | Papuchon | 350/96.14 |
| 4,203,649 | 5/1980 | Velasco et al. | 350/96.14 |
| 4,206,251 | 6/1980 | Chen | 427/100 |
| 4,211,467 | 7/1980 | Cross et al. | 350/96.14 |
| 4,217,032 | 8/1980 | Sheem | 350/96.21 |
| 4,223,978 | 9/1980 | Kummer et al. | 350/96.20 |
| 4,262,993 | 4/1981 | Burns et al. | 350/96.14 |
| 4,262,994 | 4/1981 | Sheem | 350/96.14 |
| 4,266,850 | 5/1981 | Burns | 350/96.14 |
| 4,273,411 | 6/1981 | Alferness | 350/96.14 |
| 4,284,663 | 8/1981 | Carruthers et al. | 427/164 |
| 4,291,939 | 9/1981 | Giallorenzi et al. | 350/96.14 |
| 4,296,998 | 10/1981 | Dufft | 350/96.20 |
| 4,303,202 | 12/1981 | Ramsey et al. | 350/96.20 |
| 4,329,016 | 5/1982 | Chen | 350/96.12 |
| 4,368,949 | 1/1983 | Schmidt | 350/96.20 |
| 4,381,139 | 4/1983 | Alferness | 350/96.14 |
| 4,384,760 | 5/1983 | Alferness | 350/96.14 |
| 4,390,236 | 6/1983 | Alferness | 350/96.14 |
| 4,391,486 | 7/1983 | Papuchon et al. | 350/96.14 |
| 4,400,052 | 8/1983 | Alferness et al. | 350/96.12 |
| 4,439,265 | 3/1984 | Alferness et al. | 156/606 |
| 4,447,116 | 5/1984 | King et al. | 350/96.13 |
| 4,448,479 | 5/1984 | Alferness | 350/96.14 |
| 4,452,507 | 1/1984 | Winzer | 350/96.20 |
| 4,466,696 | 8/1984 | Carney | 350/96.20 |
| 4,475,790 | 10/1984 | Little | 350/96.21 |
| 4,479,698 | 10/1984 | Landis et al. | 350/96.20 |

(List continued on next page.)

FOREIGN PATENT DOCUMENTS 2604788 8/1975 Fed. Rep. of Germany .
2030319 4/1980 United Kingdom .

OTHER PUBLICATIONS

W. Mevenkamp, "Modelling and BPM Calculation of Electrooptic Devices on LiNbO$_3$", SPIE, vol. 651 (1986), pp. 162–168.

G. B. Hocker et al., "Mode Dispersion in Diffused Channel Waveguides by the Effective Index Method," Applied Optics, Jan. 1977, vol. 16, No. 1, pp. 113–118.

(List continued on next page.)

Primary Examiner—William L. Sikes
Assistant Examiner—Robert E. Wise

[57] ABSTRACT

An electro-optic waveguide structure having a single mode channeled waveguide pattern of the Mach-Zehnder configuration is formed in a substrate of potassium titanyl phosphate.

46 Claims, 16 Drawing Sheets

U.S. PATENT DOCUMENTS

| | | | |
|---|---|---|---|
| 4,516,829 | 5/1985 | Borsuk et al. | 350/96.23 |
| 4,553,810 | 11/1985 | Alferness et al. | 350/96.14 |
| 4,554,050 | 11/1985 | Minford et al. | 156/664 |
| 4,565,558 | 1/1986 | Keil et al. | 65/1 |
| 4,618,210 | 10/1986 | Kondo | 350/96.14 |
| 4,639,074 | 1/1987 | Murphy | 350/96.15 |
| 4,645,293 | 2/1987 | Yoshida et al. | 350/96.14 |
| 4,657,341 | 4/1987 | Sammueller | 350/96.22 |
| 4,674,829 | 6/1987 | Bulmer et al. | 350/96.14 |
| 4,709,978 | 12/1987 | Jackel | 350/96.14 |
| 4,738,504 | 4/1988 | Jones | 350/96.20 |
| 4,740,265 | 4/1988 | Bierlein et al. | 156/624 |
| 4,756,591 | 7/1988 | Fischer et al. | 350/96.20 |
| 4,766,954 | 8/1988 | Bierlein et al. | 156/624 |
| 4,767,174 | 8/1988 | Carenco et al. | 350/96.20 |
| 4,799,031 | 1/1989 | Lang et al. | 333/22 R |

OTHER PUBLICATIONS

"Optical Engineering" vol. 19, No. 4, Jul./Aug. 1980, Rawson and Bailey, "A Fiber Optical Relay for Bypassing Computer Network Repeaters," pp. 628–629.

Lytel Incorporated, 1300 nm Laser Module specification.

Mitsubishi Electronics, Optoelectronic Products, FU-43SLD-2, Preliminary.

Noda, "LiNbO$_3$ Waveguide Modulator", Japan An Rev. Elect. Comput. & Telecomm., Opt. Dev. Fib., Editor Y. Suematsu, Ohm-North Holland, 190–210, 1982.

Kaminow & Liu, "Propagation Characteristics . . . Modulators", Proc. IEEE, vol. 51, 132–136, Jan. 1963.

Alferness, "Waveguide Electrooptic Modulators" IEEE Trans. Microwave Theory, vol. MTT-30, 1121–1137, 1982.

Kubota et al., "Traveling Wave Modulator . . . Waveguide" IEEE J. Quant. Elec., vol. QE-16, No. 7, 754–760, 1980.

J. Guttman et al., "Optical Fiber-Stripline-Coupler," May 1975, vol. 14, No. 5, Applied Optics, pp. 1225–1227.

E. A. J. Marcatili, The Bell System Technical Journal, "Dielectric Rectangular Waveguide and Directional Coupler for Integrated Optics," pp. 2071–2103.

E. A. J. Marcatili, "Bends in Optical Guides," The Bell System Technical Journal, Sep. 1969, pp. 2103–2132.

H. Haga et al., "LiNbO$_3$ Traveling-Wave Light Modulator/Switch With an Etched Groove," IEEE Journal of Quantum Electronics, vol. QE22, No. 6, Jun. 1986, pp. 902–906.

P. K. Tien et al., "Modes of Propagating Light Waves in Thin Deposited Semiconductor Films," Applied Physics Letters, May 1969, vol. 14, No. 9, pp. 291–294.

M. D. Feit et al., "Computation of Mode Properties in Optical Fiber Waveguides by a Propagating Beam Method," Applied Optics, vol. 19, pp. 1154–1164.

Lasertron, Diode Laser Module QLM 1300SM specification.

Fujitsu, Lightwave Semiconductors, Light-Emitting Diodes-Laser Diodes-Photodiodes.

Stantel Components, Laser Diode and Optical Receiver, Data Summary.

M. Heiblum et al., "Analysis of Curved Optical Waveguides by Conformal Transformation," IEEE Journal of Quantum Electronics, vol. QE-11, No. 2, Feb. 1975, pp. 75–83.

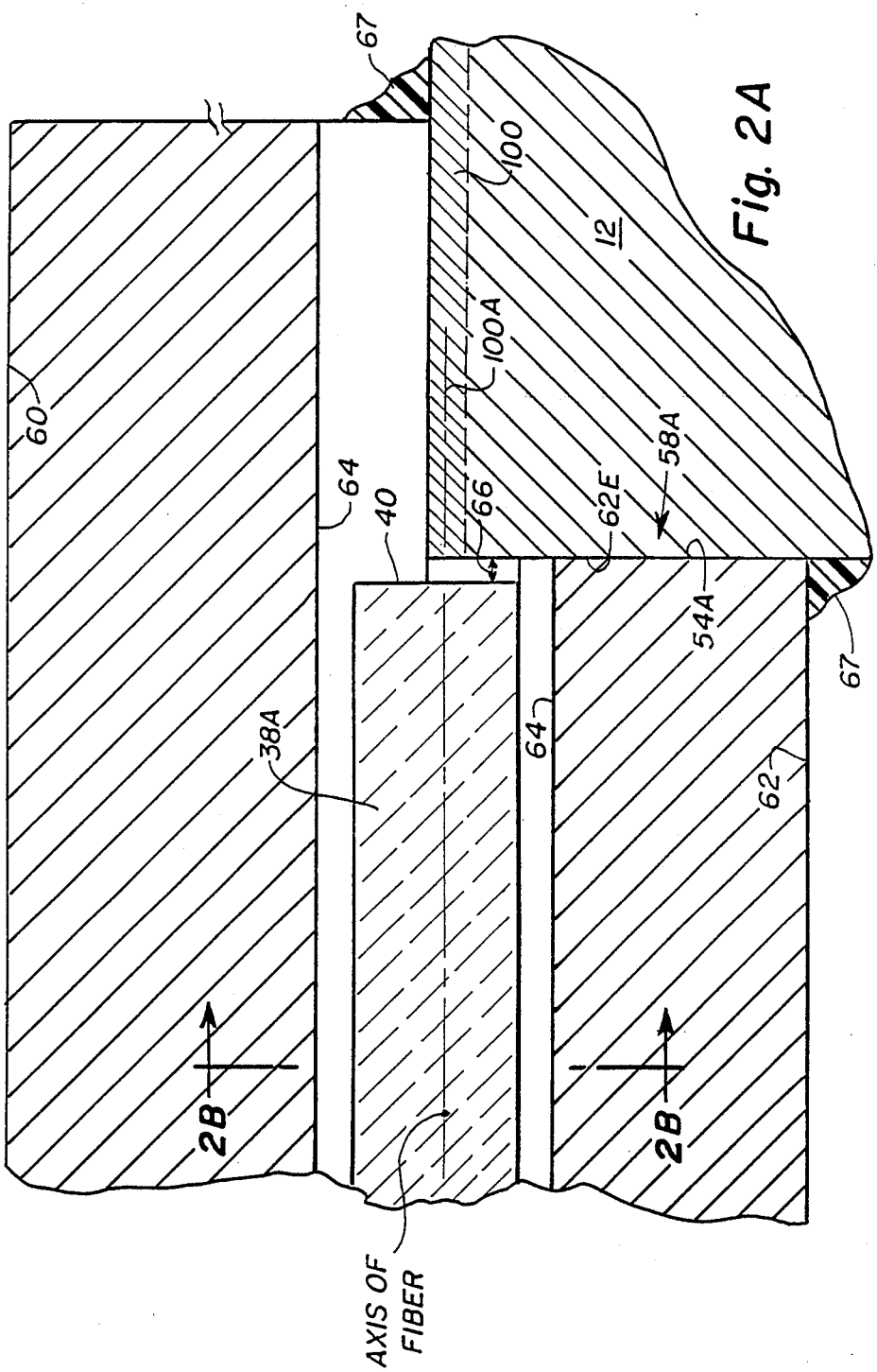

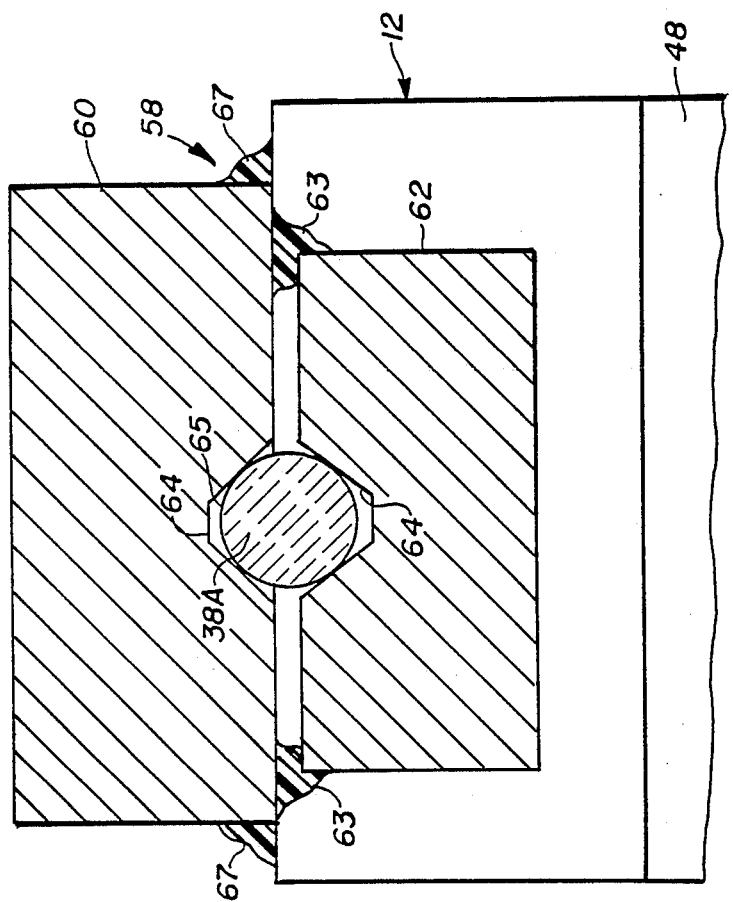

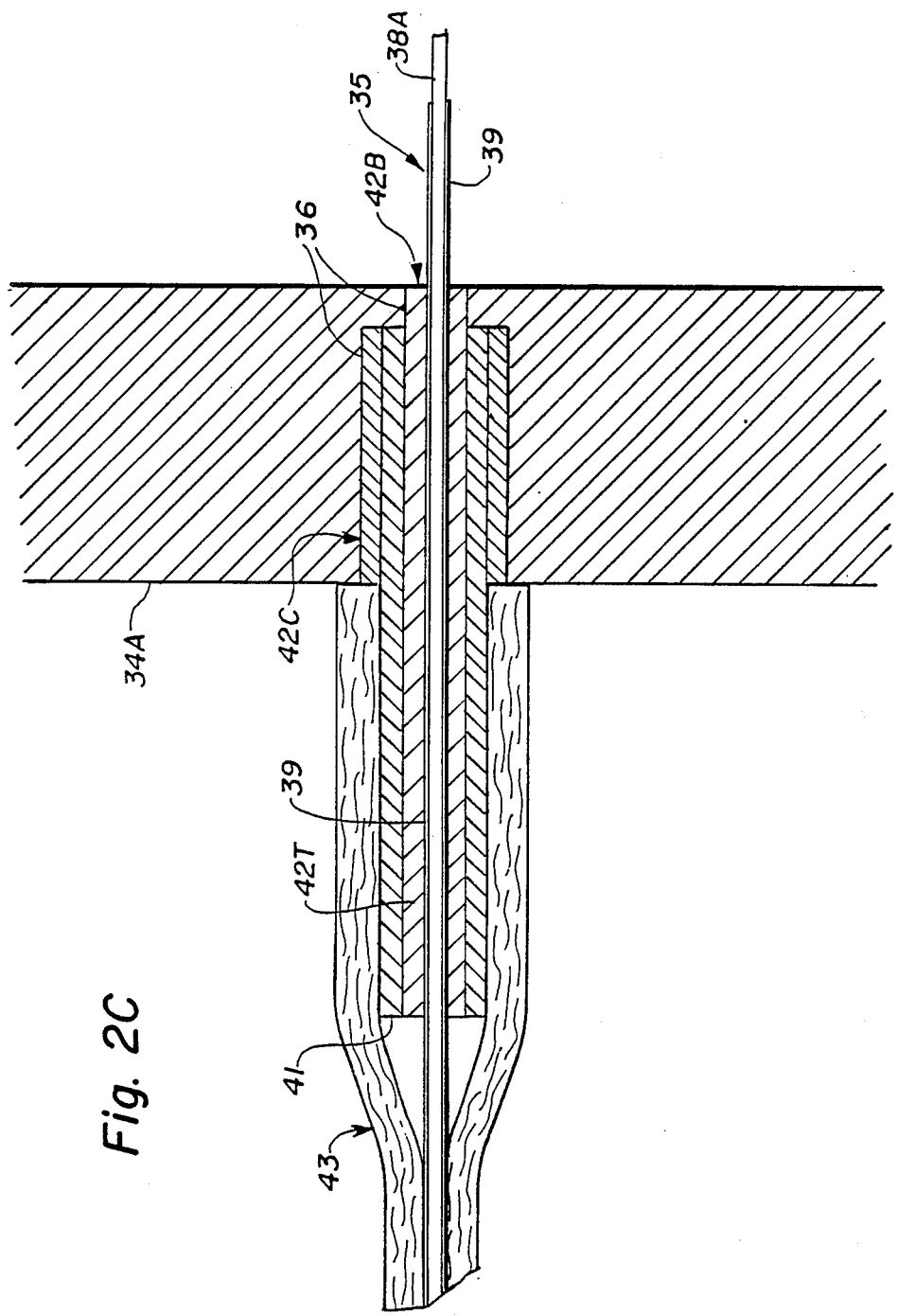

WAVEGUIDE STRUCTURE USING POTASSIUM TITANYL PHOSPHATE

BACKGROUND OF THE INVENTION

The present invention relates to intergrated electro-optic components and, in particular, to an electro-optic component having a channeled waveguide pattern therein, the component being fabricated on a substrate of potassium titanyl phosphate.

There has been much current interest in developing optical communication systems. By using optical waves to carry messages instead of electrical singals the bandwidth of communication is increased. The basic element of these systems is the optical waveguide which transmits or conducts waves of optical frequencies from one point to another and can serve to connect various devices based on optical integrated circuit technology. The optical waveguide is an optically transparent medium surrounded by media with lower indices of refraction so that light propagating along the waveguide is highly reflected at the boundaries of the surrounding media, thus producing a guiding effect. The most frequently used material for such a waveguide is high purity silica in the form of a fiber.

For use in telecommunications it has been necessary to develop optical waveguide structures which can couple, divide, switch and modulate the optical wave as it propagates through a network. Optical waveguide structures have been designed and fabricated in suitable substrates for the manipulation of guided light. Electro-optic responsive substrates such as zinc selenide, lithium niobate and more recently potassium titanyl phosphate have been used.

U.S. Pat. No. 4,070,094 (Martin) discloses an optical waveguide interferometric modulator (or "Mach-Zehnder") configuration formed on ZnSe by cadmium diffusion into the etched waveguide pattern of a silicon dioxide mask to form controllable refractive index increases in the ZnSe substrate. U.S. Pat. No. 4,447,116 (King et al.) and U.S. Pat. No. 4,266,850 (Burns) both disclose optical waveguide structures of the interferometric modulator (or "Mach-Zehnder") configuration of titanium diffused lithium niobate.

U.S. Pat. No. 4,012,113 (Kogelnik), U.S. Pat. No. 4,211,467 (Cross) and U.S. Pat. No. 4,645,293 (Yoshida et al.) disclose optical waveguide structures of the optical coupler configuration formed on titanium diffused lithium niobate.

U.S. Pat. No. 4,639,074 (Murphy) discloses a fiber optic coupling system for a lithium niobate chip. In this system the fiber is allowed to butt directly against an end face of the waveguide substrate.

One can calculate requirements of a waveguide to transmit light through a change of direction by utilizing the papers of E. A. G. Marcatili (references: E. A. J. Marcatili, The Bell System Technical Journal. Volume 48, Number 7, pages 2071–2102 and pages 2103–2132, September 1969.)

Although presently the predominant material of choice for these structures is lithium niobate, lithium niobate suffers several disadvantages. The optical wave propagation properties poorly match its microwave propagation characteristics. As a result, in devices such as interferometric modulator with traveling wave electrode structures, optical bandwidth is limited by a large difference in the speed of the optical wave and the externally applied microwave. Using a lithium niobate substrate the effective refractive index at optical frequencies is approximately 2.2 whereas it is approximately 4.2 at microwave frequencies. Haga et al., IEEE J. Quantum Elect QE-22, Number 6, 902–906, 1986. There exists a need for a modulator which has both a broad optical bandwidth and more efficient use of electrical power.

Further, lithium niobate is increasingly photorefractive at optical wavelengths significantly below 1.3 micrometers. This property leads to unacceptable device instability at optical power levels required for many applications. The high dielectric constant of lithium niobate makes it difficult to build high impedance devices to efficiently utilize microwave power.

These disadvantages of lithium niobate have been avoided by the use of potassium titanyl phosphate (KTP) as the substrate material. Copending applications Ser. No. 001,417, filed January 8, 1987, and a continuation-in-part thereof, Ser. No. 129,058 filed December 11, 1987 disclose a process for producing an optical waveguide and the product produced thereby wherein the crystal substrate is KTP.

Advantages of the potassium titanyl phosphate substrate include a better match between the optical and microwave effective indices (1.8 and 2.5 respectively) leading to a lessened velocity mismatch between microwave and optical signals. It is belived advantageous to utilize this feature of KTP in a guided wave device with a traveling wave electrode structure having greater optical bandwidth and requiring less microwave power to drive it. KTP exhibits good photorefractive stability not only for near infrared optical waves lithium niobate is employed but also at all wavelengths down to the violet. Due to the lower microwave dielectric constant KTP, design of higher impedance traveling wave electrodes is practical.

SUMMARY OF THE INVENTION

The present invention relates to an electro-optic waveguide structure having a signle crystal substrate formed of $K_{1-x}Rb_xTiOMO_4$ wherein x is from 0 to 1 and M is P or As. The substrate has at least one smooth surface wherein sufficient cations have been replaced by ions selected from at least one of Rb(+), Cs(+) and Tl(+) ions, with the proviso that when x is at least about 0.8, the replacement ions are selected from at least one of Cs+ and Tl+ ions. The substrate has a bulk index of refraction associated therewith.

In accordance with the present invention the region wherein the cations have been replaced defines a single mode channeled waveguide pattern in the substrate. The channeled waveguide pattern has a configuration including a first portion and a second portion contiguous to and communicating with the first. Each portion has an axis therethrough, the axes defining a predetermined angle of at least 0.1 degrees and more preferably 0.5 degrees.

The channeled waveguide pattern has an inferred surface index of refraction that is increased with respect to the index of refraction of the starting crystal substrate by at least 0.0045 so that an optical wave launched into the first portion of the channeled waveguide pattern propagates in a signle mode through the channeled pattern and undergoes at least one change of direction as it passes from the first portion to the second portion of the channeled waveguide pattern. At least sixty-nine percent (69%) of the predetermined initial power level of an optical wave launched into the first portion of the channeled waveguide pattern is transmitted through the change of direction.

In one of the more preferred embodiments of the invention the configuration of the waveguide pattern is an interferometric configuration (a "Mach-Zehnder" configuration). The inferred surface index of refraction is increased over the bulk index of refraction of the substrate by at least 0.0045 so that at least twenty-two percent (22%) of the initial power level of an optical wave launched into the input portion of the channeled waveguide pattern is transmitted through the channeled waveguide pattern to the output portion thereof.

A buffer layer may be disposed on the substrate over the waveguide pattern. The buffer layer extends a predetermined height h above the surface of the substrate. The buffer layer may be a single or a multiple layer structure that exhibits a difference between the index of refraction with respect to the substrate such that the product of the height and the difference in indices lies in the range 0.01 to 1.0 and more preferably in the range from 0.15 to 1.0.

Also in accordance with the present invention suitable arrangements are provided to mount the waveguide structure within a suitable housing therefor, to secure an optical fiber to waveguide structure, and to mount the fiber to the housing.

A traveling wave electrode structure includes a pair of electrodes spaced by a predetermined gap. One of the electrodes has a width dimension such that the ratio of the width to the gap is in the range from 0.1 to 150, and more particularly in the range from 0.8 to 113. A lumped electrode structure includes a pair of electrodes, one of which has a predetermined width dimension. An inductor is connected in series with the one electrode.

BRIEF DESCRIPTION OF THE DRAWINGS

The invention will be more fully understood from the following detailed description thereof, taken in connection with the accompanying drawings which form a part of this application and in which:

FIGS. 2A and 2B are enlarged views in front elevation and in end section of a mounting clip adapted to mount an optic fiber to the waveguide structure of FIG. 1 while FIG. 2C is a side sectional view entirely in section of a strain relief arrangement for the optic fiber as the same passes through the end panel of the housing;

DETAILED DESCRIPTION OF THE INVENTION

Figure 1:
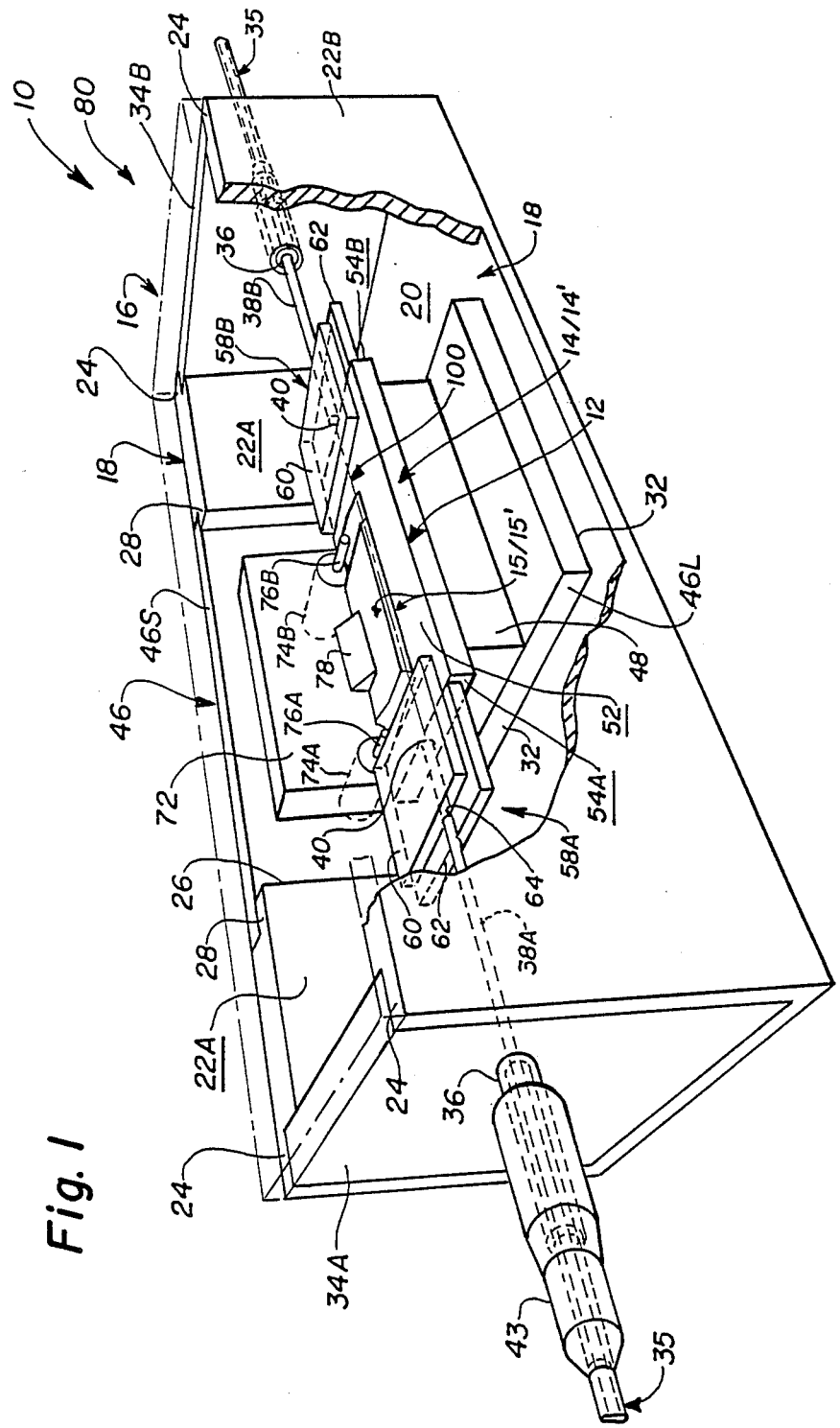
FIG. 1 is a perspective view of an electro-optic component having a channeled waveguide structure in accordance with the present invention, with part of the outer housing of the component broken away for clarity of illustration.

Throughout the following detailed description similar reference numerals refer to similar elements in all figures of the drawings.

With reference first to FIG. 1 shown in a perspective view is a electro-optic component generally indicated by reference character 10 having a dielectric waveguide structure generally indicated by reference character 12 in accordance with the present invention. The dielectric waveguide structure 12, in the preferred embodiment, itself includes a buffer layer 14 (or 14') and an electrode structure 15 (or 15') each in accordance with the present invention. As will be developed the waveguide structure 12 has formed therein a channeled waveguide pattern generally indicated by reference character 100 in accordance with the present invention which exhibits a predetermined configuration. The waveguide pattern 100 is believed best seen in connection with FIGS. 3 and 5 but is indicated only schematically in FIG. 1. The configuration of the waveguide pattern 100 includes at least one change of direction. The waveguide pattern 100 has an index of refraction and geometric parameters sufficient to guide an optical wave through the change of direction with a predetermined loss of power.

The component 10 includes a housing 16 which, in the preferred instance, is comprised of a base member 18 that includes a generally planar floor 20 from which extend generally parallel, opposed long walls 22A, 22B. The walls 22A, 22B are notched at their ends, as at 24. One of the walls 22A is interrupted by an opening 26, the boundaries of which are notched, as at 28. The floor 20 of the base 18 is also interrupted by an opening 32 that registers with the opening 26 in the long wall 22A. Although not visible in FIG. 1 the boundary of the opening 32 is also notched. Preferably the base 18 is formed of 304 stainless steel overplated with three to five micrometers of nickel metal itself overplated with a layer of gold 0.5 to two micrometers thick.

The notches 24 disposed at the opposed open ends of the long walls 22A, 22B of the base 16 accept end panels 34A, 34B. The panels 34A, 34B are fabricated of a material similar to that used for the base 18. The end panels 34A, 34B are secured to the longs walls 22A, 22B by an epoxy cement, such as that sold by Epoxy Technology Inc. of Billerica, Massachusetts as Type 370G. Each of the end panels 34A, 34B carries a fiber optic cable 35 connected to the panel 34. Each panel 34A, 34B has a counterbored opening 36 therethrough. A predetermined length of optical fiber 38 extends from the jacket 39 (FIG. 2C) of the cable 35 beyond each panel 34 and into the interior of the housing 16. The fiber 38 terminates in a planar end face 40 that is disposed perpendicularly to the axis of the fiber 38. Any suitable fiber 38 may be used, such as the fiber as manufactured by Sumitomo Inc. having an outer diameter of 125 micrometers and an inner core diameter of 9 micrometers, (so called "9/125" fiber). One optical fiber (e.g., the fiber 38A extending through the panel 34A) serves as an input fiber for optical waves, while the other fiber 38B serves an output fiber.

FIG. 2C is a side sectional view of the portion of one end panel 34A through which one of the fibers, e.g., the fiber 38A, enters the housing 16. Since the fiber 38A is, as will be developed, fixed both to the end panel 34A and to the waveguide structure 12 it is possible that fabrication error and/or thermally induced misalignment between these members and the fiber could impose a stress on the fiber that may cause the same to break. The relatively long length of the fiber between the end panel 34A and the waveguide structure 12 accommodates lateral misalignments by fiber flexure. To provide a strain relief for the exposed length of the optical fiber 38 of the cable at the region of the end panel 34A the jacket 39 of the cable 35 is surrounded by a stainless steel support tube 41. Preferably the tube 41 is fabricated of 304 stainless steel. The support tube 41 is secured to the outside surface of the jacket 39 of the cable 35 by any suitable means of attachment, such as by a low modulus epoxy cement 42T. Suitable for use for such an epoxy is that sold by Epoxy Technology, Inc. as Type 301 epoxy. The same cement holds the jacket 39 in the bore 36, as shown at 42B. The tube 41 is itself secured to the end panel 34 in the counterbore 36 formed therein, as at 42C. The tube 41 may be brazed to the panel 34. A protective sheath, preferably in the form of a plastic shrink tube 43 surrounds the support tube 41 and a portion of the jacket 39 immediately adjacent thereto. The shrink tube 43 may be formed of a polytetrafluorethylene material that sold under the trademark "Teflon." The combination of the low modulus cement and the attachment of the jacket 39 to the panel 34A and to the tube 41, as the case may be, allows axial expansion and contraction without transferring deflections to the fiber 38 which could cause axial stress therein. A corresponding arrangement is provided for the fiber 38B entering the housing 16 through the other end panel 34B.

A generally L-shaped insert 46 is introduced into the aligned openings 26, 32 respectively defined in the long wall 22A and the floor 20 of the base 18. The insert 46 is formed of the same material as the base 18. The longer portion 46L of the L-shaped insert 46 that is received into the opening 32 in the floor 20 of the base 18 carries a mounting pedestal 48. The pedestal 48 is fabricated of a dielectric material, such as a slab of microwave quartz, that serves to isolate electrically the waveguide structure 12 from the insert 46. The pedestal 48 is preferably three millimeters thick. Suitable for use as the pedestal 48 is the material sold by Heraeus Amersil Inc., Sayreville, New Jersey, as Type 18 Infrasil 2. Alternatively, other dielectric materials which have a low microwave dielectric constant, e.g., less than about 12, and a low loss to microwave power, e.g., loss tangent of less than 0.01, would be suitable.

The pedestal 48 may be cemented (e.g., using Type 370G epoxy cement sold by Epoxy Technology Inc.) or otherwise suitably secured in its desired operative position on the insert 46. The L-shaped insert 46 is closely received by the notches 28 bounding the opening 26 and the notches bounding the opening 32 and is there secured in place by any suitable means of attachment, such as Type 370G epoxy sold by Epoxy Technology Inc. The ionic conductivity characteristic in the Z-direction of the crystal substrate material used to form the waveguide structure 12 requires the presence of the pedestal 48 to isolate the waveguide structure 12.

The dielectric waveguide structure 12 is a generally rectanguloid member which will be described in more detail herein. Suffice it to say at this point that the structure 12 is formed of a slab of crystalline potassium titanyl phosphate material (hereafter also referred to in places by the shorthand appellation "KTP"). The waveguide structure 12 has a generally planar upper surface 52 bounded by a pair of opposed optically polished end facets 54A, 54B. It should be understood that the character 52 refers to the upper surface of the complete waveguide structure 12, which, as will be developed, may include a suitable buffer layer 14 or 14' and the electrode structure 15 or 15' as will be described. The facets 54A, 54B are to be understood to define the lateral boundaries of the complete waveguide structure 12. In the preferred instance the facets 54A, 54B extend in a plane perpendicular to the surface 52. The waveguide structure 12 is attached to the quartz pedestal 48 by an electrically nonconductive epoxy, such as that sold by Epoxy Technology Inc. as Type 370G.

Each of the optical fibers 38 entering the housing is coupled to a respective input port and output port of the channeled waveguide pattern 100 formed in the waveguide structure 12 using a mounting clip arrangement 58A, 58B, respectively. One of the chips 58A, 58B is respectively disposed in adjacency to each respective facet 54A, 54B of the waveguide structure 12. Each of the mounting clips 58A, 58B is itself formed of an upper and a lower mounting elements 60, 62, respectively. Each of the mounting elements 60, 62 is preferably formed of noncompensated silicon and is provided with a truncated V-shaped groove 64 that extends an operative distance across the breadth of the element. The grooves 64 are arranged in the elements 60, 62 such that, when the elements 60, 62 are overlaid in staggered manner with respect to each other in the assembled relationship illustrated in the FIG. 1, the respective axes of the grooves 64 provided on the elements 60, 62 coaxially register with each other.

The details of the mounting clip arrangement 58A are believed best illustrated in FIGS. 2A and 2B. The extending length of the optical fiber 38 is laid into the groove 64 in the upper element 60. The lower element 62, which underlies the upper element 60, is arranged such that the groove 64 therein also accepts the extending length of the fiber 38. The grooves 64 thus cooperate to define a passage 65 (FIG. 2B) that is sized to receive closely the optical fiber 38 therein. The elements 60, 62 are cemented together, as at 63, using the index matching epoxy mentioned below. The face 40 of the extending length of the fiber 38 within the passage 65 is spaced a predetermined clearance distance 66 on the order of one or two micrometers from the edge 62E of the lower mounting element 62. The same index matching epoxy may be placed in this clearance space. If not, one might use antireflec-coating on the end surface of the channeled waveguide (to eliminate Fresnel loss). The edge 62E of each of the lower element 62 is brought into abutting relationship with one of the facets (e.g., the facet 54A, as shown in FIG. 2A) of the waveguide structure 12. The axis of the fiber 34A is colinear with the propagation axis 100A of the channeled waveguide 100. In this disposition the exposed portion of the lower element 62 serves as a transition shelf for the extending length of the fiber 38 while the overhanging portion of the upper element 60 overlies the upper surface 52 of the waveguide structure 12. Each of the mounting clips 58 is secured to the waveguide structure 12 by cementing the upper element 60 to the waveguide structure 12 as at 67. The cement used at 63, 67 (and in the clearance 66, if desired) is a refractive index matching epoxy such as that identified as type ELC-4481 sold by Electro-Lite Corporation, Danbury, Connecticut. Since the element 60 is formed of noncompensated silicon the upper element 60 is spaced from the electrode structure 15 to avoid impedance discontinuity. An identical relationship is defined for the opposite facet 54B and the mounting clip arrangement 58B there disposed for the fiber 38B.

It should be appreciated from the foregoing that the optical fibers 38A, 38B are aligned with the input and output ports of the channeled waveguide pattern 100 to thereby introduce an optical wave into and transmit an optical wave from the waveguide structure. The provision of the clearance distance 66 prevents the face 40 of the exposed length of the fiber 38A, 38B from contacting against the respective facets 54A, 54B of the waveguide structure 12. This is believed to be advantageous in that it avoids the imposition of stress on the waveguide structure 12 which could damage the optically polished facet 54A, 54B and interfere with the insertion of energy from the fiber 38A into the waveguide structure 12.

Referring again to FIG. 1 the inside surface of the shorter portion 46S of the insert 46 carries an enlargement 72 that receives terminals 74A, 74B from a source of modulating energy, such as an electrical generator operating at microwave frequencies. As will be developed herein the projecting center electrodes 76A, 76B from the connectors 74A, 74B, respectively, are disposed in electrical connection with the electrode structure 15 or 15' disposed on the waveguide structure 12. Preferably the connectors 74A, 74B are implemented using Type SMA connectors (50 ohm) sold by Amphenol Inc. The connector 74A launches power. The connector 74B is a terminator. The inside surface of the enlargement 72 is provided with a fillet 78 of conductive epoxy such as that sold by Epoxy Technology Inc. as Type H 81. The fillet 78 engages a portion of the electrode structure 15 provided on the upper surface 52 of the waveguide structure 12 to ground the same. The housing 16, including connector structure 74 is believed capable of accommadating electrical frequencies up to thirteen (13) GHz.

A cover 80, shown in dot-dash lines, is superimposed over the open top of the housing 16 as defined by the assembled base 18, end panels 34A, 34B, and insert 46. The cover 80 is fabricated from the same material as the base 18 and is secured to the upper edges of the above-recited elements forming the housing 16 by any suitable means of attachment, such as Type 370G epoxy sold by Epoxy Technology Inc. In the preferred instance the elements forming the housing 16 are joined in a manner that seals the volume on the interior of the housing 16.

It should be understood that the housing 16 as above described is the preferred structure, but other suitable configurations for the elements of the housing 16 and their mode of interconnection may be varied and remain within the contemplation of the present invention. For example, the housing may exhibit other than the rectanguloid configuration shown in the Figure. In addition the various parts may be combined into integrated or partially integrated structures as will be readily apparent to those skilled in the art.

With reference now to FIGS. 3 and 4 and FIGS. 5 and 6, shown are plan views and side section views of two embodiments of a dielectric waveguide structure 12 in accordance with the present invention. As will be developed herein the waveguide structure 12 in accordance with the present invention includes a channeled waveguide pattern 100 that has predetermined geometric parameters and a predetermined configuration associated therewith so that optical energy introduced into the channeled waveguide pattern is propagated as a single mode through at least one change of direction with only a predetermined loss of power. The channeled waveguide pattern 100 shown in FIGS. 3 and 4 exhibits the interferometric configuration common to the so-called Mach-Zehnder interferometer exemplified in the above-referenced patents to King and to Burns. The channeled waveguide pattern shown in FIGS. 5 and 6 exhibits the configuration common to the directional coupler as exemplified by the above referenced patents to Cross and to Kogelnik.

The waveguide structure 12, as noted earlier, includes a slab of single crystal electro-optic material that forms a substrate 104 for the channeled waveguide pattern 100. In FIGS. 3 through 6 the crystal substrate is z-cut, that is the plane of the cut is perpendicular to the z direction of the crystal. The material of the substrate 104 has the formula

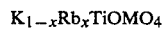

$$K_{1-x}Rb_xTiOMO_4$$

wherein x is from 0 to 1 and M is P or As.

The substrate 104 of the waveguide structure 12 has at least one smooth surface 108. The channeled waveguide pattern 100 is defined in the crystal substrate 104 in those regions thereof wherein sufficient cations have been replaced by ions selected from at least one of Rb(+), Cs(+) and Tl(+) ions, with the proviso that when x is at least about 0.8, the replacement ions are selected from at least one one of Cs+ and Tl+ ions. In this preferred instance the substrate 104 for the waveguide structure 12 is potassium titanyl phosphate (KTP). In the preferred instance the K+ ions are replaced by Rb+ ions. The substrate 104 has a bulk index of refraction associated therewith.

Figure 4:
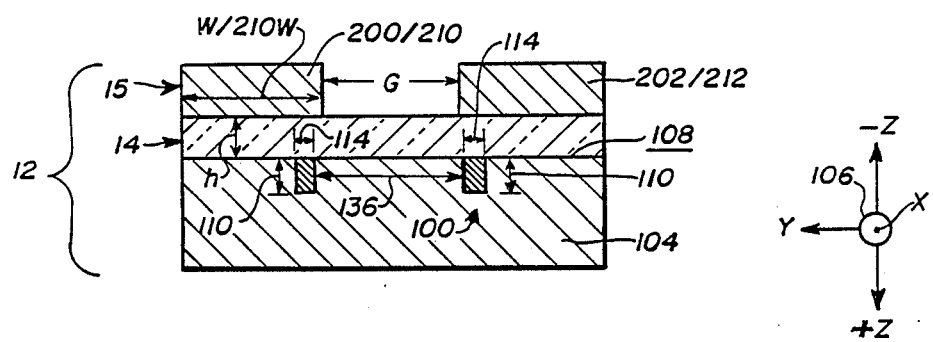
FIG. 4 is a side sectional view of the waveguide structure shown in FIG. 3 taken along view lines 4—4 in FIG. 3, with the electrode structure shown above the buffer layer of the waveguide structure.
Figure 6:
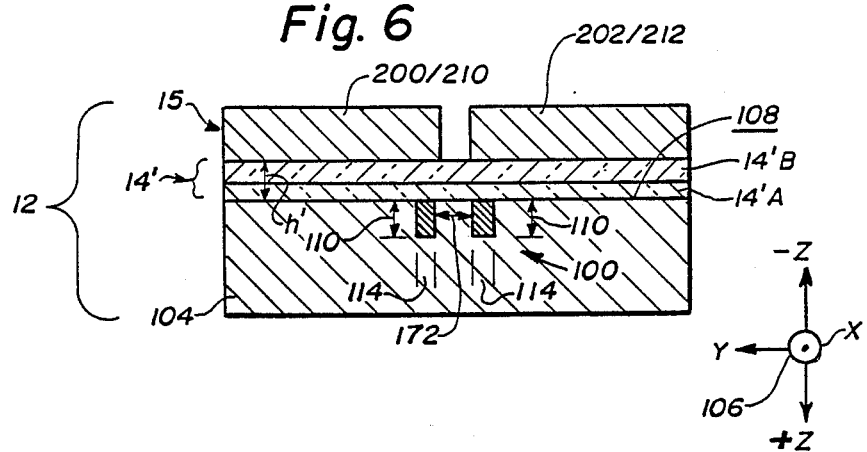

In the FIGS. 4 and 6 the channeled waveguide 100 is shown to exhibit planar sidewalls owing to the lack of lateral diffusion of rubidium (Rb+) into z-cut KTP. The lower boundary of the channeled waveguide pattern is meant to be a schematic representation of the maximum depth to which rubidium (Rb+) diffuses during the waveguide pattern fabrication process. Although the description herein is defined in terms of a z-cut crystal it should be understood that other crystal cuts may be used. In such cases the lateral boundaries of the channeled waveguide pattern may exhibit shapes other than that shown in FIGS. 4 and 6.

As is also seen from FIGS. 4 and 6 the channeled waveguide 100 has a predetermined depth dimension 110 into the substrate and a predetermined transverse dimension 114 across the substrate associated therewith. These geometric parameters of the channeled waveguide 100 are discussed more fully herein.

The waveguide pattern has a configuration having a first and a second portion, the second portion being contiguous to and in communication with the first. Each portion has an axis, with the axes defining an angle at least 0.1 degrees (and more preferably 0.5 degrees) therebetween.

In accordance with this invention the waveguide pattern 100 has an inferred surface index of refraction that is greater than the bulk index of refraction of the starting crystal substrate 104 by at least 0.0045. More preferably, the difference between the inferred surface index of refraction of the channeled waveguide pattern 100 and the bulk index of refraction of the starting crystal substrate 104 is at least 0.012. A difference in indices will permit an optical wave to be propagated in a single mode through at least one change of direction. At least sixty-nine percent (69%) of the initial power level of the optical wave is propagated through the change of direction. The importance of the magnitudes of the differences in these indices of refraction and their impact on the conduction of an optical wave in the channeled waveguide pattern 100 through a change of direction will be made manifest in connection with the discussion of FIGS. 10A to 10E and FIG. 11 herein.

As used throughout this application the increase in the inferred surface index of refraction $\Delta N_s$ of the channeled single mode waveguide pattern 100 with respect to the bulk index of refraction of the starting crystal and the predetermined depth dimension 110 are the corresponding effective parameters determined by applying the measurement using the prism coupler technique described in the paper by Tien, Applied Physics Letters, Volume 14, Pages 291 to 294 (1969) suitably modified to accommodate the complementary error function refractive index profile. This paper is hereby incorporated by reference herein. The refractive index profile with distance into the channeled waveguide pattern is believed to follow the rubidium, cesium and thallium concentration profile measured using an electron microprobe and be a maximum at the surface and decrease according to the complementary error function as the refractive index approaches the value of the crystal substrate. The measurement is made using a 45 degree-45 degree-90 degree rutile prism and a helium neon laser. A planar waveguide having a size commensurate with measurement by the prism coupler technique is prepared using the same process conditions as used to form the channeled waveguide pattern 100. The slab is excited using light at a frequency which will produce at least two propagation modes. To facilitate example calculations showing Mach-Zehnder behavior in FIGS. 10A through 10E a representative average index $\Delta N$ is used, which can be obtained by fitting values obtained by the method of Tien to a rectangular refractive index profile. For the slab waveguide measured inferred surface index $\Delta N_s$ exceeds the computed averaged index $\Delta N$ by about fifty percent (50%).

The bulk index of refraction of the crystal substrate is also measured using the above described prism coupler method.

As seen in FIGS. 4 and 6 the channeled waveguide pattern 100 extends a predetermined distance 110 into the crystal substrate 104. In these FIGS. 3 and 4 and FIGS. 5 and 6 the crystallographic directions are indicated with reference to the coordinate axes 106 on the drawings. In the Figures the distance 110 is measured from the smooth planar upper surface 108 of the substrate 104 along the z direction of the crystal. The distance 110 is such that an optical wave will be guided in a single TM mode in the x direction of the crystal. Propagation in the x direction is chosen in order to avoid crossing the seed region of the crystal. The magnitude of the distance 110 is dependent upon the wavelength of the optical wave being propagated. The channeled waveguide pattern 100 has a transverse dimension 114 measured in FIGS. 4 and 6 along the y axis of the crystal. The magnitude of the dimension 114 is also related to the wavelength of the optical wave and is simultaneously selected to permit propagation as a single mode with a minimum of insertion loss from the fiber 38.

In the preferred instance the dimensions 110 and 114 should each be in the range from one-half (0.5) to ten (10) micrometers, permitting the waveguide structure 12 to guide a single mode TM optical wave ranging in wavelength from the visible to the near infrared. Preferably, the optical waves at wavelengths of 0.63 micrometers and 1.3 micrometers are used.

It should be understood that it lies within the contemplation of the present invention to utilize the z-cut crystal with the channeled waveguide pattern 100 oriented along directions other than the x direction and/or propagating other than TM modes. It should also be understood that it lies within the contemplation of the present to provide a waveguide structure utilizing alternate crystal cuts, orienting the channeled waveguide pattern 100 in compatible alternate propagation directions, using compatible alternate propagation modes and/or exhibiting compatible alternate electrode geometry (differing from that which will be described herein). The selection of these compatible parameters is made in accordance with well-known techniques developed for use with guided wave device theory. It should be understood that the waveguide 100 may be buried in the substrate 104 and remain within the contemplation of this invention.

Figure 3:
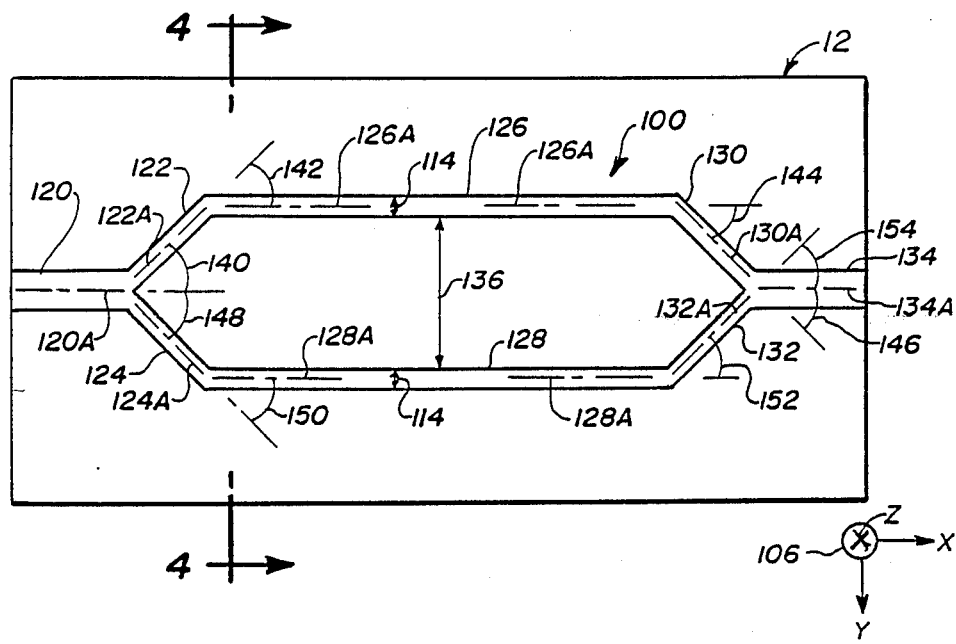
FIG. 3 is a plan view of a waveguide structure in accordance with the present invention having a channeled waveguide pattern in a Mach-Zehnder configuration formed therein, with the electrode pattern omitted for clarity of illustration.

With reference now to FIG. 3, the interferometric or Mach-Zehnder configuration for the waveguide pattern 100 includes an input port or input portion 120. The input portion 120 diverges into and communicates with contiguous input transition portions 122 and 124. As is well known, this junction, being relatively wider than the portions there joined, may exhibit multimode properties. Each input transition portion 122 and 124 is contiguous to and communicates with a respective interaction portion 126 and 128. Each interaction portion 126 and 128 communicates with and is contiguous to respective output transition portions 130 and 132. The output transition portions 130 and 132 converge toward an output port or output portion 134. This junction may also have multimode properties. The interaction portions 126 and 128 are spaced with a predetermined gap 136 sufficient to preclude evanescent optical field coupling therebetween. Preferably the gap 136 is on the order of 20 micrometers.

Each of the portions 120-134 of the interferometric configuration of the waveguide pattern 100 has an associated axis indicated in the FIG. 3 by the suffix "A" appended to the corresponding reference character. In accordance with the present invention the axes of adjacent contiguous portions define predetermined bend angles 140-154. Each bend angle indicates the magnitude of the deviation or change of direction from a generally linear propagation direction of the optical wave through the corresponding portion of the waveguide pattern 100. Preferably in accordance with the present invention each of the bend angles 140-154 is at least 0.1 degree. More preferably, the magnitude of each bend angle 140-154 is 0.5 degree. Thus, for example, the included angle between the axes of the input transition regions 122 and 124 for the Mach-Zehnder configuration is at least 0.2 degrees and is more preferably one degree.

As is seen in FIG. 3 the portion 120-134 of the waveguide pattern 100 are, in the preferred instance, generally linear in geometry. However, it should be understood that some or all of the portions of the waveguide pattern 100 may take other waveguide configurations known in the art. For example the waveguide configuration known as a Hanning bend may be used. It should also be understood, however, that although the interferometric configuration of the waveguide pattern is shown in FIG. 3 to be symmetric, it should be understood that the angles 140-154 need not be equal. Thus, as a consequence the interaction portions need not, for example, be parallel.

Figure 5:
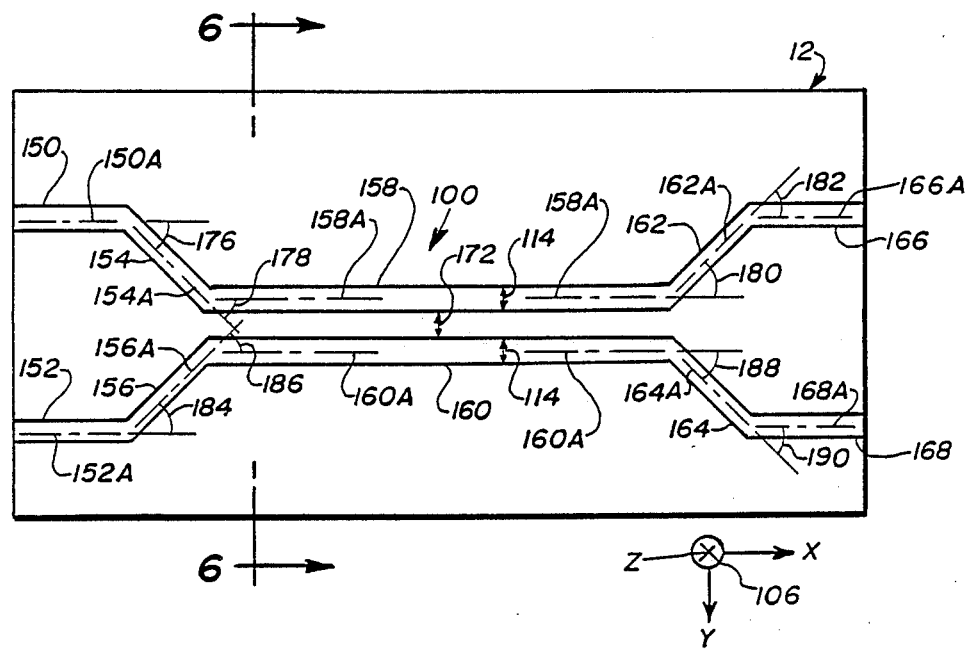
FIGS. 5 and 6 are plan and side sectional views respectively similar to the views shown in FIGS. 3 and 4 illustrating a waveguide structure having a channeled waveguide pattern in a directional coupler configuration.

With reference now to FIG. 5, the directional coupler configuration for the waveguide pattern 100 includes input ports or input portions 150 and 152. The input portions 150 and 152 are each contiguous to and communicate with a converging transition portion 154 and 156, respectively. Each converging transition portion 154 and 156 is contiguous to and communicates with a respective interaction portion 158 and 160. Each interaction portion 158 and 160 communicates with and is contiguous to a respective converging transition portion 162 and 164. The converging transition portions 162 and 164 are each contiguous to and communicate with an output port or output portion 166 and 168, respectively. In the case of the directional coupler configuration shown in FIG. 5 the interaction portions 158 and 160 are spaced with a predetermined gap 172 sufficient to couple optical energy from interaction portion 158 to 160. Preferably the gap 172 is on the order of one to ten micrometers. The dimension 174 of each of the interaction portions 158 and 160 is selected, in the preferred instance, to be one coupling length.

Each of the portions 150-168 of the directional coupler configuration has an associated axis indicated in the FIG. 5 by the suffix "A" appended to the corresponding reference character. In accordance with the present invention the axes of adjacent contiguous portions define predetermined bend angles 176-190. Similar to the Mach-Zehnder configuration shown in FIG. 3 each bend angle indicates the magnitude of the deviation or change of direction from a generally linear propagation of the optical wave. Preferably in accordance with the present invention each of the bend angles 176-190 is again at least 0.1 degree. More preferably, the magnitude of each bend angle 176-190 is 0.5 degree.

As is seen in FIG. 5 the portions 150-168 are, in the preferred instance, generally linear in geometry. However, it should be understood that as in the case of the Mach-Zehnder the portions 150-168 may take other waveguide geometries known in the art. For example the Hanning bend may also be used. It should also be understood, however, that although the directional coupler configuration of the waveguide pattern 100 is shown in FIG. 5 to be symmetric, it should be understood that this is not necessary and that an asymmetric arrangement may be used.

The waveguide structure 12 further includes a buffer layer 14 thereon. The buffer layer is provided to minimize ohmic loss of optical wave energy by contact between the evanescent tail of the wave and the metallic electrode structure.

In FIG. 4 the preferred configuration of the buffer layer 14 is shown, while FIG. 6 illustrates an alternate configuration 14' for the buffer layer. Either configuration of buffer layer 14 or 14' may be used with either the embodiment of the invention shown in FIGS. 3 and 4 or the embodiment shown in FIGS. 5 and 6.

In the preferred case (FIG. 4) the buffer layer 14 is comprised of a layer of silicon dioxide. The buffer layer 14 extends a predetermined height dimension h above the surface 108 of the substrate 104. The surface 108 serves only as a reference datum for measurement of the height of the buffer. Accordingly disruptions in the smoothnes of this surface, (e.g., during subsequent fabrication) should not be outcome determinative so long as the height h (or h') of the layer 14 (or 14') may be reasonably accurately ascertained. The buffer layer 14 has a bulk index of refraction associated therewith. The bulk index of refraction of the buffer layer 14 is well known from standard reference sources, as Weast, Handbook of Chemistry and Physics, 53rd Edition, 1972-1973. As noted earlier the substrate 104 also has a bulk index of refraction associated therewith. The bulk index of refraction of the buffer layer 14 is less than the bulk index of refraction of the substrate 104 by a number $\Delta n$. The height h dimension and the difference $\Delta n$ in the bulk indices of refraction of the substrate 104 and the buffer layer 14 are selected such that the product $$h \bullet \Delta n \quad (1)$$

lies in the range between 0.01 and 1.0 micrometers. More preferably the product should lie in the range between 0.15 and 1.0 micrometers.

For the preferred materials of the substrate 104 (KTP) and the buffer layer 14 (silicon dioxide) the magnitude of the difference $\Delta n$ is on the order of 0.3. For example, in the instance where the optical wave has a wavelength on the order of 1.3 micrometers the height dimension h is on the order 3000 Angstroms (0.3 micrometers) and the product ($h \bullet \Delta n$) in the Equation (1) is on the order 0.09 micrometers.

In the alternative embodiment shown in FIG. 6 the buffer layer 14' may be configured from a composite of two or more strata 14'A and 14'B of material. A composite buffer layer 14' may be desirable to achieve a low effective index of refraction for the layer 14' simultaneously with achieving other desirable properties of the layer, such as adhesion and chemical compatibility with the substrate 104. For example, the stratum 14'A may be silicon dioxide while the stratum 14'B may be magnesium fluoride.

Each of the strata of material forming the buffer layer 14' has a predetermined well known bulk index of refraction associated therewith such that the buffer layer 14' has a total height h' and an effective bulk index of refraction n' associated therewith. The effective bulk index of the layer 14' is a parameter associated with the extent of the evanescent tail into the buffer layer. The effective bulk index of refraction of the buffer layer 14' is less than the bulk index of refraction of the substrate 104 by a number Δn'. The height h' and the difference Δn' in the bulk indices of refraction between the substrate 104 and the composite buffer layer 14' are such that the product $$h' \bullet \Delta n' \qquad (2)$$

lies in the range between 0.01 and 1.0 micrometers. More preferably the product should lie in the range between 0.15 and 1.0 micrometers.

For the preferred materials of the strata 14'A, 14'B of the composite buffer layer 14' (silicon dioxide and magnesium fluoride, respectively) and for the preferred material of the substrate (KTP) the magnitude of the difference Δn' is on the order of 0.4. For example, in the instance where the optical wave has a wavelength on the order of 1.3 micrometers the height dimension h' is on the order 2000 Angstroms (0.2 micrometers) and the product (h•Δn) in Equation (2) is on the order 0.08 micrometers.

In addition, it should be understood that although the FIGS. 4 and 6 illustrate the buffer layers 14, 14', respectively extending across the gaps 136, 172 between the interaction portions of the waveguide patterns such need not necessarily be the case. In addition it should be understood that materials other than those discussed above may be used to form the buffer layer 14 or 14', as the case may be, in an effort to increase the number Δn or Δn', thus allowing the dimension h or h' to be minimized for optimum field mode overlap. If the substrate 104 for the waveguide structure is formed using a crystal cut different than a z-cut a buffer layer may not be necessary.

Figure 7:
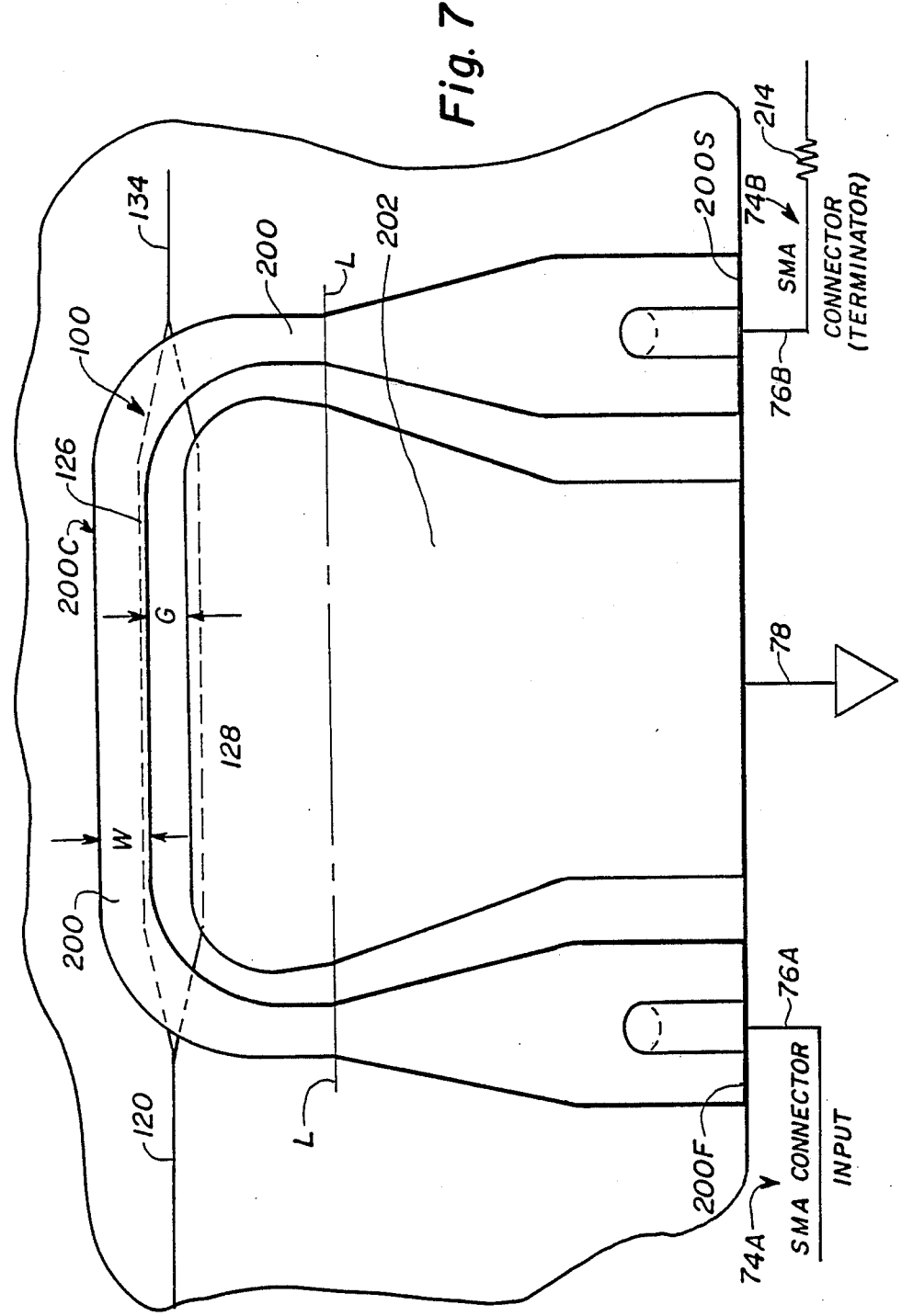
FIG. 7 is a plan view of a traveling wave electrode structure useful with a waveguide structure in accordance with the present invention.
Figure 8:
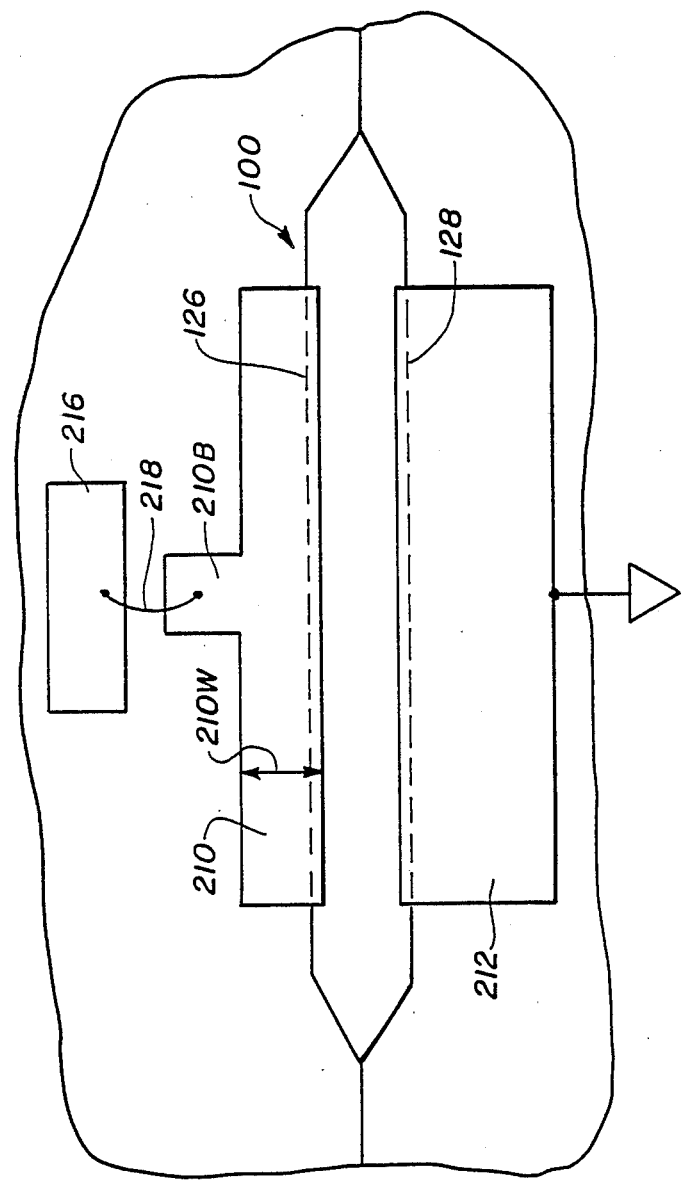
FIG. 8 is a plan view of a lumped electrode structure useful with a waveguide structure in accordance with the present invention.

With reference now to FIGS. 7 and 8 shown are respective plan views of alternate configurations for the electrode structures 15, 15' useful with the z-cut waveguide structure 12 in accordance with the present invention. In FIG. 7 a traveling wave electrode structure 15 useful primarily at relatively high electrical frequencies, typically greater than twelve GigaHertz, is shown. The electrode structure may even be useful as high as 26 GigaHertz, although the connector 74 may impose a practical limit on the electrical frequency. FIG. 8 illustrates a lumped electrode structure useful primarily (when formed without inductive peaking) at lower frequencies, typically from one to three GigaHertz. Higher frequencies may be achieved if inductive peaking is provided. The lumped electrode structure may be used to achieve lower frequencies, into the MegaHertz range, if desired. Although FIGS. 7 and 8 illustrate the electrode structures 15' as superimposed over the waveguide pattern 100 having the Mach-Zehnder configuration of FIGS. 3 and 4 it should be understood that either of the electrode structures 15, 15' may be appropriately modified for use with the waveguide pattern having the directional coupler configuration shown in FIGS. 5 and 6. In either case, any configuration for the buffer layer structure, as described above, may be used.

As seen in FIG. 7 the electrode structure 15 includes a pair of electrodes 200 and 202 which are arranged in a predetermined pattern with respect to the channeled waveguide pattern 100 provided on the waveguide structure 12. As seen in the preferred instance the first electrode 200 includes a central region 200C that overlies the entire interaction portion 126 of the channeled waveguide pattern 100. The second electrode 202 preferably takes a substantially planar form that overlies the entire interaction portion 128 of the waveguide pattern 100. The inside edges of the electrodes 200 and 202 extend slightly past the interaction portions 126 and 128 of the channeled waveguide pattern.

The first, or "hot", electrode 200 has a predetermined length dimension as measured from its first end 200F to its second end 200S. Since in the FIG. 7 the first end 200F is adjacent to the input portion 120 of the channeled waveguide pattern 100 it may be referred to as the input end of the electrode 200. Correspondingly since the second end 200S is adjacent to the output portion 134 of the channeled waveguide pattern 100 it may be referred to as the output end of the electrode 200. Since the electrode 200 is symmetrical, it should be understood that the input and output ends of the electrode may be reversed so long as the corresponding input and output portions of the channeled waveguide pattern are reversed. It is noted that failure to maintain the described correspondence between the ends of the electrode 200 and the ends of the channeled waveguide pattern would deleteriously affect the optical bandwidth of the waveguide structure 12.

The first electrode 200 has a predetermined width dimension associated therewith. The width dimension of the electrode 200 is indicated in the FIG. 7 by the character "W" and varies along the length of the electrode. The width W of the electrode 200 is relatively enlarged in the regions adjacent the ends 200F, 200S thereof and tapers to a relatively narrow width along the central region 200C of the electrode 200.

The first electrode 200 is spaced from the second electrode 202 along the entire length of the first electrode thereby to define a predetermined gap dimension therebetween. The gap dimension is indicated in the FIG. 7 by the reference character G. In the preferred implementation the gap dimension G varies along the length of the first electrode 200. Defining a reference line L it may be seen from FIG. 7 that the gap dimension G varies as one proceeds from the ends of the electrode to the line L. On the other side of the line L the gap dimension G is substantially constant.

However the electrodes 200, 202 and the gap G therebetween is configured, in accordance with the present invention the ratio of the width dimension W of the first electrode 200 along its length to the gap dimension G along the same length preferably the ratio lies in the range 0.1 to 150, and more preferably lies in the range from 0.8 to 113.

In operation the first end 200F of the electrode 200 is connected to the center electrode 76A (FIG. 1) of the connector 74A while the second end 200S of the electrode 200 is connected to the center electrode 76B of the connector 74B. The relatively enlarged regions of the electrode 200 define "landing pads" where the center electrodes 76A, 76B are respectively bonded directly (i.e., without use of intermediate microwave bandwidth degrading bond wires). The bond is formed using a conductive epoxy, such as that sold by Epoxy Technology as Type H20) although other expedients such as low temperature soler (e.g., indium) could be used. Of course, bond wires could be used if desired.

The end 200F of the electrode serves as the input for microwave energy while the end 200S serves as the termination for the microwave energy. The landing pads are designed to present a predetermined input and output impedance (each on the order of fifty ohms) that matches the impedance of the above identified fifty ohm connectors 74A and 74B that are used. Since the connector 74B is located off the waveguide structure 12 heat generated by the dissipation of microwave energy occurs away from the waveguide structure 12.

It should be understood that a resistor 214 may, if desired, be disposed on the waveguide structure to serve as the terminator for the microwave energy. Alternative methods of launching and terminating the microwave energy could be used, if desired.

It will be recalled that the second electrode 202 is grounded to the metallic housing 16 of the component 12, via the fillet 78, as discussed in connection with FIG. 1.

The configuration of the electrodes 200, 202 imparts a compact microwave guiding arrangement that efficiently utilizes the surface area of the waveguide structure. The traveling wave electrode structure of FIG. 7 sets the hot electrode to interelectrod gap ratio (W/G) to give a constant impedance (on the order of fifty ohms) throughout the length of the electrode structure with excellent electrical (microwave) bandwidth.

In operation, microwaves launched from the first end of the electrode 200F are guided along the gap G between the electrodes 200, 202. The microwave field that passes perpendicularly to the surface 108 of the channeled waveguide pattern 100 modulates the optical wave propagation properties of the channeled waveguide pattern through the linear electro-optic effect. If the waveguide structure 12 requires a high bias to set its operating point a standard SMA connector 74B may have insufficient power handling capability necessitating use of higher power terminater.

FIG. 8 is an alternate, lumped, electrode structure is that includes a first, "hot" electrode 210 and a second ground plane electrode 212 arranged in a predetermined pattern with respect to the interaction portions 126, 128 of the channeled waveguide pattern 100 in a manner similar to that discussed in FIG. 7. The degree that the electrodes 210, 212 overlie along the length of the interactions portions 126, 128 is not consequential. The first electrode 210 has a predetermined width dimension 210W associated therewith. A landing tab 210B is defined on the first electrode 210. The width dimension 210W lies in the range from twenty to fifty micrometers. This results in less electrode heating at the high power levels typically required for high bandwidth operation. Alternately the dimension 210W may be in the range from five to twenty micrometers. Such a structure would be useful for relative low frequency sensor applications.

A separate conductor region 216 is provided for connection to an external source of microwave energy. If desired an inductor element 218 may be connected in series with the first electrode 210 and the conductor region 216 to extend the bandwidth of the microwave energy. Preferably the inductor element 218 has a value in the range from zero (i.e., the inductor 218 is omitted) to eight nanoHenries. In the preferred case the inductor 218 is implemented using a bond wire having an appropriate length significant to impart the desired value of inductance into the circuit. The inductor may be implemented in any convenient alternate manner. The foregoing electrode structure is useful with microwave frequencies in the range from zero to four GHz. If the inductor 218 is used, the frequency range is increased, from zero to six GHz.

Figure 9:
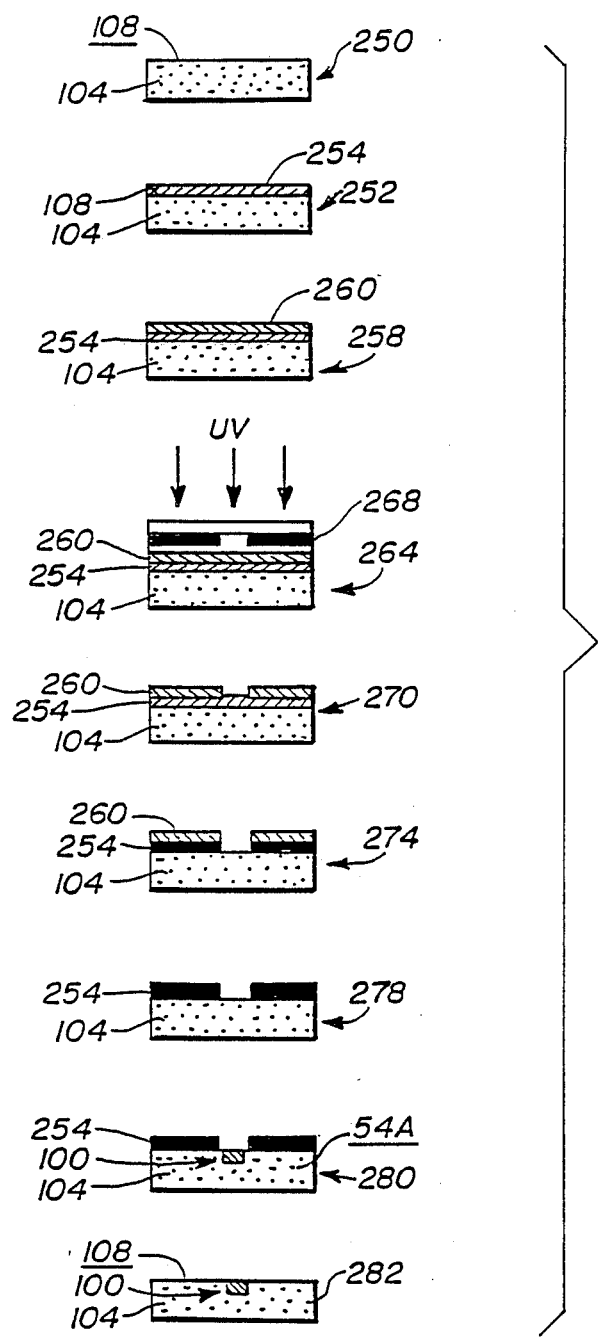
FIG. 9 is a highly stylized schematic representation of the method steps necessary to form a waveguide structure having a channeled waveguide pattern of a predetermined configuration therein.

The process for fabricating the waveguide structure 12, including the formation of the channeled waveguide pattern 100 in the substrate 104, may be understood from the highly schematic flow diagram of the method steps shown in FIG. 9.

In the first step 250 a wafer of z-cut KTP is sawed from a crystal boule and polished to a predetermined finish. Suitable boules of KTP are availabel from Litton Airtron Inc. of Morris Plains, New Jersey. The boule is x-ray oriented to determine the crystallographic directions and sawed into a z-cut wafer that forms the substrate 104. Thereafter the wafer is ground polished using an alumina slurry (first three micrometer, then one micrometer) and final polished using a buffered silicon dioxide suspension (particle size 0.25 micrometers) to the smooth surface 108. As used herein the term "smooth" means finish no worse than scratch dig polish per MIL SPEC-O- 13830, and preferred flatness to one-half wavelength per inch and scratch dig 1015.

In the second step 252 the titanium film 254 which will serve as the ion exchange mask is evaporated onto the smooth surface 108 of the substrate 104. Preferably the mask is provided on the side of the crystal substrate 104 of negative domain direction. It is this side of the crystal into which the channeled waveguide pattern will be formed by ion exchange. Deposition of the titanium is accomplished in a Leybold Heraeus L560 Thin Film Deposition System. A titanium film 254 having a thickness of at least four hundred (400) Angstroms is deposited. Other refractory metals, dielectric materials such as ceramic or glass and metals such as aluminum, gold or platinum can be used to form the ion exchange mask.

In step three 258 a film 260 photoresist, such as the photoresist manufactured by Shipley Co. of Newtown, Massachusetts and sold as Type 1450J, is spun onto the surface 108 of the substrate 104. The photoresist forms a layer to a thickness of one micrometer.

In step 4 264 the photoresist 260 is exposed through a lithographic mask 268 with thirty-five (35) milliJoules per square centimeter at 365 nanometers with unfiltered Xenon lamp UV light. A suitable mask 268 is a chrome plated glass mask having the particular waveguide pattern of interest formed thereon. A Karl Suss, of Waterbury Center, VT, photolithographic unit model MJB3 is preferred.

In step 5 270 the exposed photoresist layer is developed. The development process leaves the titanium layer 254 exposed in the those areas of the substrate 104 where ion exchange is to occur.

In step 6 274 the exposed portions of the titanium layer 254 are etched to expose the crystal substrate 104 to be ion exchanged. The titanium layer 254 is plasma etched using a fluorinated plasma. In a planar plasma etcher manufactured by Semi Group sold as model 1000 PP, a plasma is produced by applying three hundred sixty-eight (368) watts of RF power to one hundred (100) millitorr with thirty-five (35) degrees C. platen temperature and flow of fifty (50) SCCM sulfur hexafluoride. The etch rate is approximately 0.02 micrometers per minute. It is understood that other means such as commercially available chemical etchants could be used to etch the titanium layer. An appropriate chemical etchant is a solution of: (1) 25 grams per liter EDTA solution; (2) 10% hydrogen peroxide solution; and (3) 14% ammonium hydroxide. The rate of etch is one hundred (100) Angstroms per minute at fifty (50) degrees Centigrade.

In the next step 278 the photoresist layer 260 is stripped leaving the titanium mask 254 and exposed crystal substrate 104 for subsequent ion exchange.

After deposition of the ion exchange mask, the wafer edges are beveled by grinding and polishing to a particle size of about one micrometer to remove all imperfections where cracks could initiate. In the step 280 a molten salt bath of rubidium mitrate/calcium nitrate in a ratio of preferably 80 mole percent rubidium nitrate and 20 mole percent calcium nitrate is prepared after dehydrating $CaNO_3 \cdot nH_2O$. The mixture is heated to a temperature between 310 and 400 degrees centigrade, depending upon the desired characteristics of the waveguide structure. The substrate is slowly lowered into the salt bath through a gradient of approximately 150 degrees Centigrade over a period of 10-20 minutes The substrate is left in the bath from one to three hours, preferably two hours, depending upon the desired characteristics of the waveguide structure. The substrate is then slowly withdrawn from the bath into room temperature through a gradient of approximately 150 degrees Centigrade over a period of 10-20 minutes.

It has been found that a molten salt bath of approximately 350 degrees Centigrade and a bath exposure time of two hours is preferred for producing a Mach-Zehnder structure which operates at an optical wavelength on the order of 1.3 microns.

The substrate is edge mounted and edges are ground to form the facets 54A, 54B. A three micrometer alumina slurry is used. The part is cleaned to remove the alumina particles and the edges are further polished in a diamond to a 0.25 micrometer particle size.

In the step 282 the ion exchange mask is removed by either chemical or plasma etching, as described above, the remaining titanium from the surface of the ion exchanged substrate.

To form buffer layer 14, a thin dielectric layer is deposited to separate the waveguide structure from the metalized electrode structure. The layer can be a single dieletric or composite layer structure. In the preferred case (FIG. 4), buffer layer 14 is composed of silicon dioxide. The layer is deposited by evaporation in the Leybold Heraeus S60 Electron Beam Evaporator. However it is also possible to deposit it by sputter deposition. The thickness deposited is preferably 0.35 to 0.40 micrometers and the product (h•Δn) is on the order of 0.10 to 0.12 micrometers.

The electrode structures as shown in FIGS. 7 and 8 are fabricated by depositing a thin film adhesion layer such as 500 to 1000 angstroms of titanium metal followed by a thin film of at least 600 angstroms of gold metal over the buffer layer 14. To prepare the traveling wave electrode structure of FIG. 7, a photoresist such as one sold by Shipley Corporation of Newtown, Massachusetts, as type 1400-37 is spun to a thickness of 3 micrometers and developed to expose the gold surface where thick electrodes 200, 202 will be electroplated. A layer of three micrometers of soft gold is subsequently electroplated. The photoresist is removed and the structure is etched to the buffer layer to remove the thin layers of metal where electroplating did not occur. A suitable etchant for gold is the halogen-iodine based etchant sold by J. E. Halma Corporation of Lodi, N.J. as GE6. The titanium is etched as previously described.

To prepare a lumped electrode structure as shown in FIG. 8, the resist is developed to preserve the Ti/Au metal deposition discussed above in the areas where the electrodes 210, 216 are desired. The remaining photoresist is removed and the Ti/Au films underneath are etched with a suitable chemical etchant discussed above.

With reference now to FIGS. 10A through 10E shown is a series of computer generated psuedo-three dimensional graphic plots graphically illustrating the power distribution of an optical wave traversing a waveguide structure having a single mode channeled waveguide pattern with an interferometric configuration as shown in FIG. 3 in accordance with the present invention. Each of the FIGS. 10A through 10E is labeled with the value of the difference between the inferred surface index of refraction of the channeled waveguide pattern and the bulk index of refraction of the starting crystal.

Calculations supporting the graphic plots were performed using a beam propagation program constructed in accordance the following articles: (1) Feit and Fleck, Jr., "Computation of Mode Properties In Optical Fiber Waveguides By A Propagation Beam Method", Applied Optics, Volume 19, Number 7, April 1, 1980; (2) Mavenkamp, "Modeling and BPM Calculation of Electro-optic Devices On $LiNbO_3$", SPIE, Volume 651, Integrated Optical Circuit Engineering III (1986); (3) Hocker and Burns, "Mode Dispersion in Diffused Channel Waveguides By The Effective Index Method", Applied Optics, January 1977, Volume 16, Number 1; and (4) Heiblum and Harris, "Analysis of Curved Optical Waveguides By Conformal Transformation", IEEE Journal of Quantum Electronics, February 1975. Each of these articles is hereby incorporated by reference herein. A reference wavelength of 1.3 micrometers and a channeled waveguide width (114) of six micrometers were assumed. The model is insensitive to waveguide pattern depth 110 and does not account for Fresnel losses at the end facets of the waveguide structure. A rectangular diffusion profile was assumed. The interaction portions were assumed to be ten millimeters, with a gap dimension 136 of twenty micrometers. A $TM_o$ mode optical wave was launched into the channeled waveguide. The included angle (angle 140 plus angle 148) was one degree. The program was executed on a Cray Model XMP/24 invoking subroutines FFT2C and ERF from the International Mathematical and Statistical Library. The program determines the eigenfunctions for the optical wave and propagates the fundamental eigenfunction through the waveguide pattern of FIG. 11.

Figure 11:
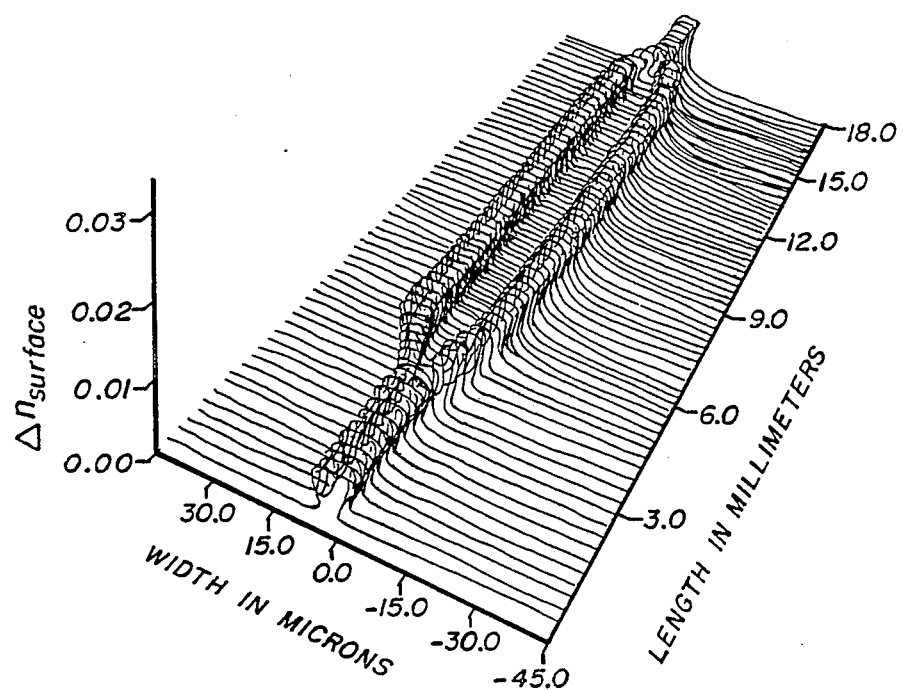
FIG. 11 is a graphical plot illustrating the profile of the inferred surface index of refraction of the channeled waveguide pattern of the waveguide structure of the present invention with respect to the bulk index of refraction of the substrate.

FIG. 11 is a psuedo-three dimensional plot of the profile of the inferred surface index of refraction of a channeled waveguide pattern with respect to the bulk index of refraction of the starting crystal. It is seen that the profile corresponds to the interferometric configuration of the channeled waveguide pattern shown in FIG. 3.

These plots in FIGS. 10 and 11 exhibit that, in accordance with the present invention, a single mode optical wave is well guided at differences between the inferred surface index of refraction and the bulk index of refraction of the starting crystal substrate of 0.0045 or greater (FIGS. 10B-10E). By "well guided" it is meant that the peak of the optical wave generally exhibits the configuration of the profile shown in FIG. 11.

Figure 10A:
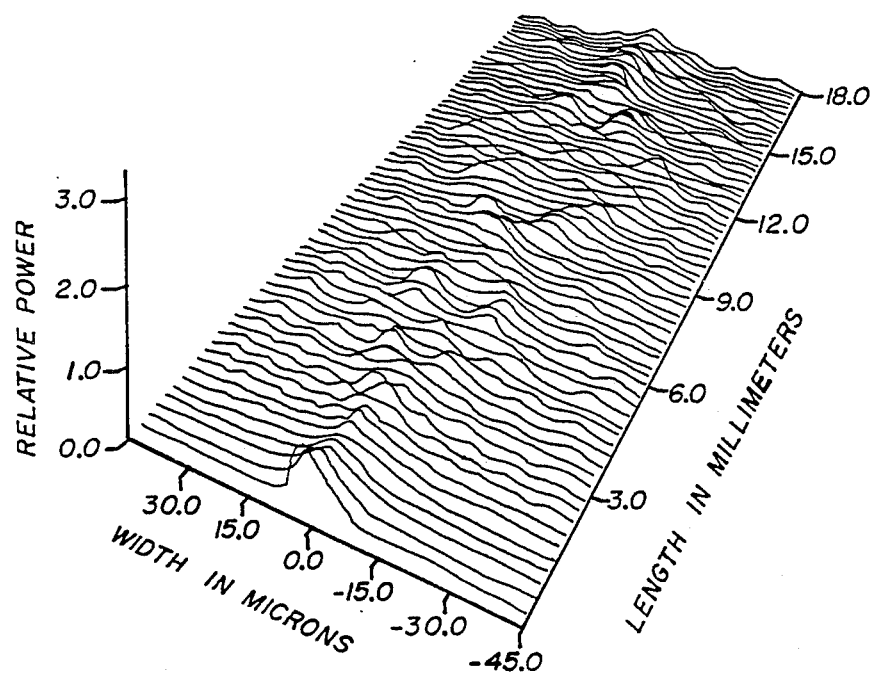
FIGS. 10A, 10B, 10C, 10D, and 10E are a series of computer generated drawings illustrating the effect of increasing difference between the inferred surface index of refraction of the channeled waveguide pattern and the bulk index of refraction of the crystal substrate of the waveguide structure on the ability of the channeled waveguide pattern to conduct a wave of optical energy inserted at one end of the channeled waveguide pattern through at least one change of direction.
Figure 10B:
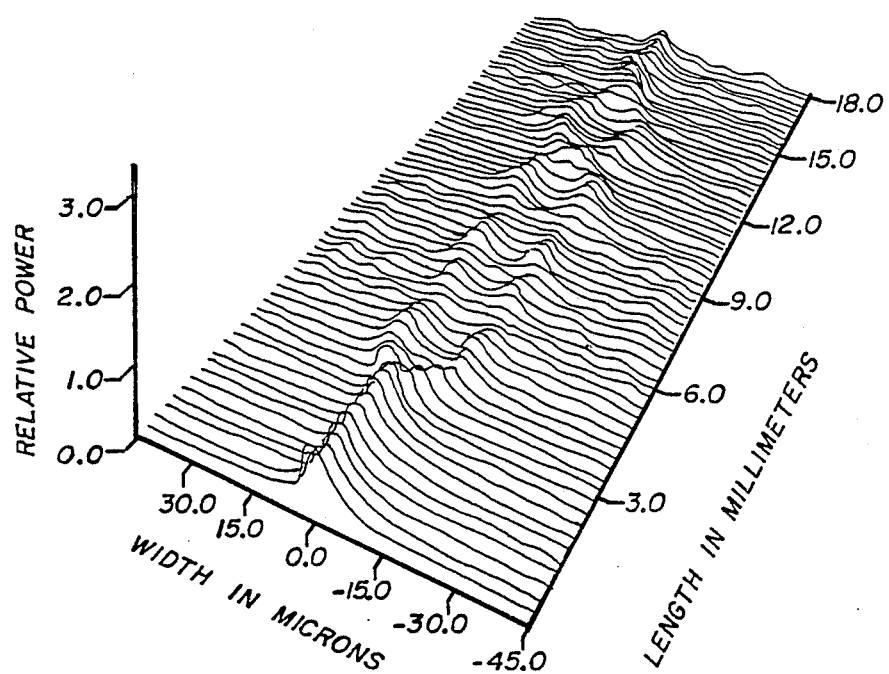
Figure 10C:
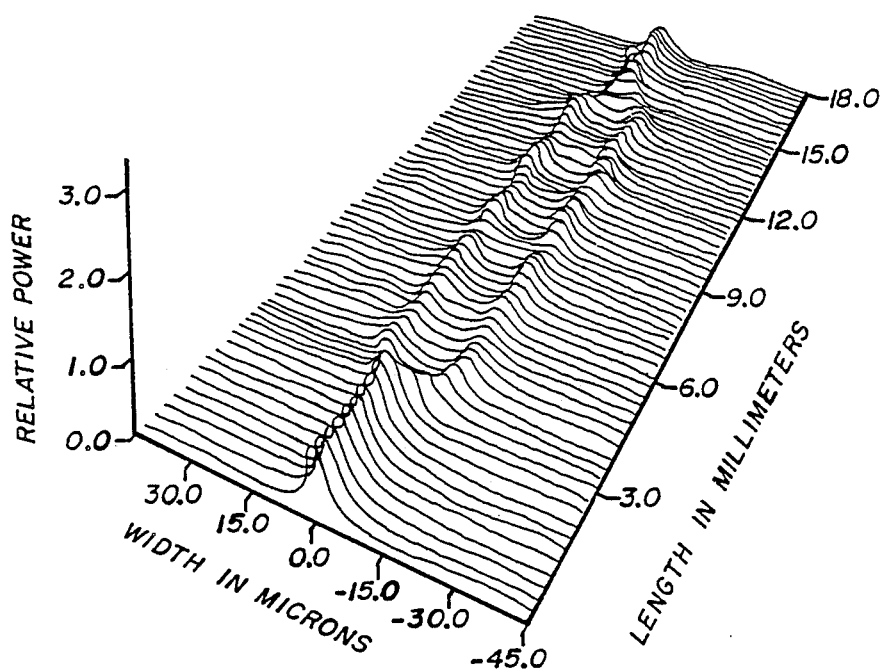
Figure 10D:
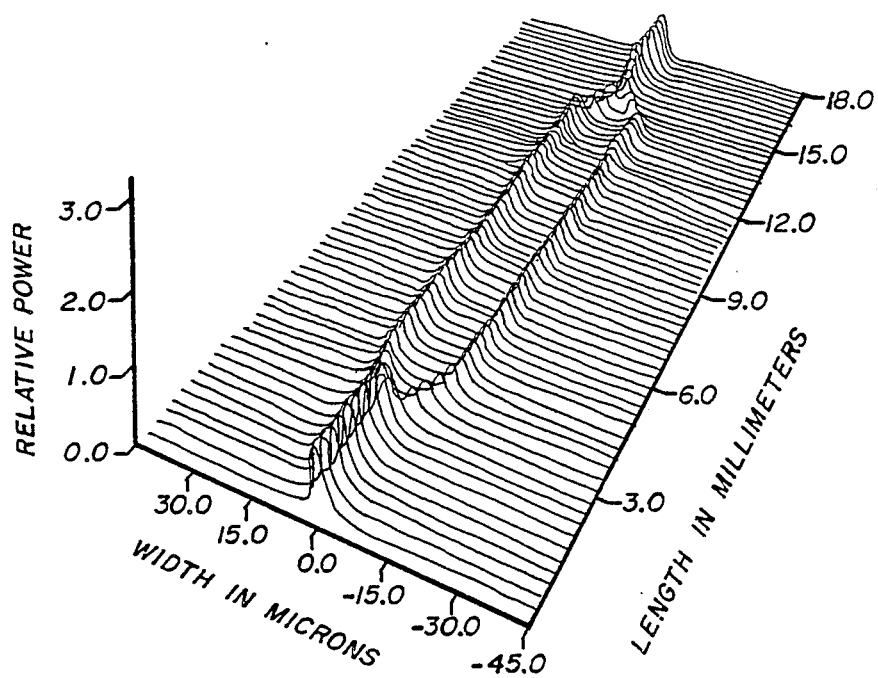
Figure 10E:
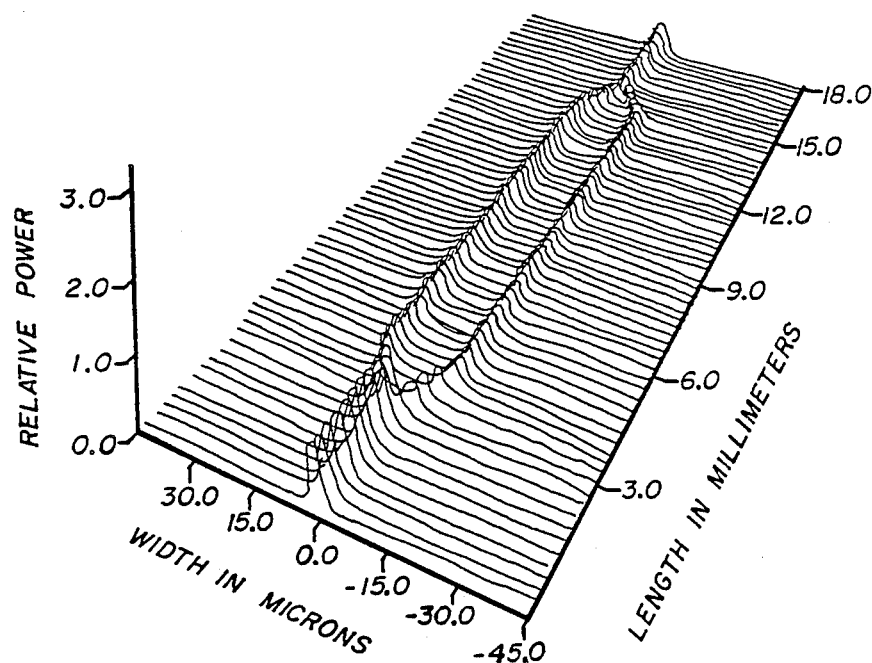

For example, for differences between indices below 0.0045 the plot (FIG. 10A) clearly illustrates the channeled waveguide pattern loses the ability to efficiently guide the optical wave, as is evidenced by the irregular power distribution. The peak at length eighteen millimeters is merely an artifact of the model due to reflections off the edges of the model area. As seen in FIG. 10B the interferometric pattern begins to appear. As is seen in FIGS. 10C, 10D and 10E, the power is well guided along the interferometric configuration.

In FIG. 10B at least forty-five percent (45%) of launched power is conducted theoretically from input port to the output port by the interferometric configuration. Even better guiding with greater power transfer can theoretically be achieved by increasing the difference between the inferred surface index and the bulk index of the substrate. For example an interferometric waveguide pattern as seen in FIG. 10D having a difference between the inferred surface index and the bulk index of the starting crystal on the order of 0.012 theoretically transfers approximately eighty percent (80%) of the optical power from the input port to the output port.

Note that the relative power output shown in the plots are theoretical values and do not include losses that occur in an actual device. To account for such losses the relative power output value shown in the plots must be reduced by scaling by approximately 0.50 to relate them with actually measured power transmitted by the constructed waveguide structure. It is believed that the model is accurate to one significant figure and the measured value (discussed below) is valid to two significant figures. When the theoretical power values are multiplied by the scaling factor one obtains a more realistic estimate of the relative transferred power. In FIG. 10B the value is approximately twenty two percent. In FIG. 10C the value is approximately thirty percent. In FIG. 10D the value is approximately thirty nine percent. In FIG. 10E the value is approximately thirty five percent.

Potassium titanyl phosphate (KTP) offers certain advantages for a Mach-Zehnder modulator than the commonly used electro-optic substrate lithium niobate. Using the teaching of the present invention a number of Mach-Zehnder modulators having a KTP substrate, a channeled waveguide, a buffer layer, and either a traveling wave electrode or a lumped-type test electrode were constructed. Parameters determined by fitting values using the method of Tien using a complimentary error function index of refraction profile were: depth (110) 6.8 micrometers; $\Delta N$ TE surface 0.014; $\Delta N$ TM surface 0.012. These measured parameters were also fit to a rectangular index profile yielding depth 4.0 micrometers, $\Delta N$ TE surface 0.0095 and $\Delta N$ TM surface 0.0079. The best waveguide structure transmitted at least forty-two percent (42%) of the initial power level of an optical wave launched thereinto from the input port to the output port. Including Fresnel losses thirty-five percent (35%) power is transmitted.

Figure 12A:
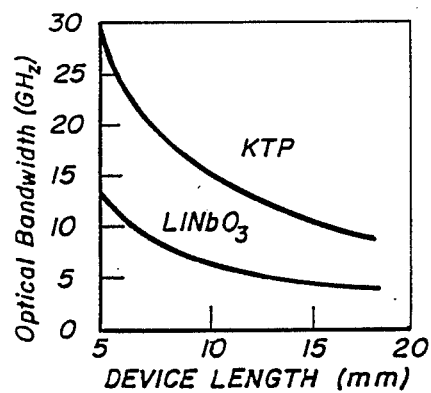
FIGS. 12A, 12B, and 12C illustrate graphical representations of theoretical performance characteristics of a Mach-Zehnder interferometer utilizing traveling wave electrodes fabricated on potassium titanyl phosphate and on lithium niobate.
Figure 12B:
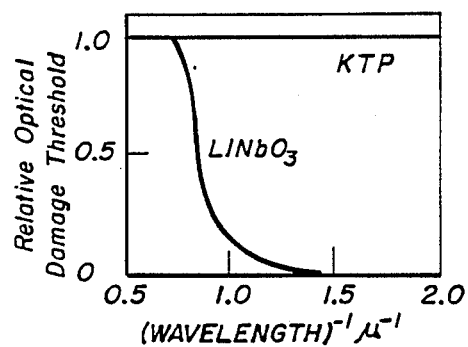
Figure 12C:
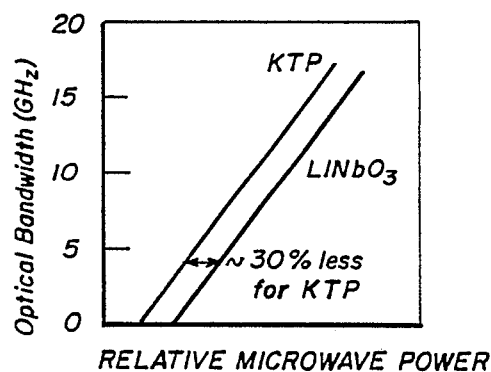

FIGS. 12A through 12C show results from a theoretical comparison between Mach-Zehnder modulators made on KTP (buffer layer omitted) in accordance with the present invention and on LiNbO$_3$. A KTP Mach-Zehnder offers wider optical bandwidth than a similar device on LiNbO$_3$ (FIG. 12A). This results from better matching between optical and microwave index in KTP than LiNbO$_3$. Because KTP is not photorefractive in the visible like LiNbO$_3$ (FIG. 12B), stable devices are possible for visible optical modulation at power levels exceeding one hundred microwatts, thus extending the choice of sources and detectors. It is believed these devices will be stable at substantially higher power levels. Certain device parameters like switching voltage are also enhanced by operation at shorter wavelengths. Finally these figures show a KTP Mach-Zehnder modulator (z-cut) requires about thirty percent (30%) less microwave power than a similar device in LiNbO$_3$ (FIG. 12C). Calculations suggest that even a further microwave power advantage may exhibit on other crystal cuts than z-cut.

Modulators have been tested at both 1.3 (monomode) and 0.63 (multimode) microns with good stability. The Table sets forth the best results of such tests. The Table does not represent the parameters of a single device, but the best result achieved for any given parameter from the lot of devices tested. These tests confirm the high optical bandwidth potential and short wavelength operability of a Mach-Zehnder fabricated on KTP.

TABLE

|  | PRESENT BEST-RESULTS | |
| --- | --- | --- |
|  | $\lambda = 1.3\ \mu m$ | $\lambda = 0.63\ \mu m$ |
| Optical Bandwidth[1,3]: | 12 GHz | 12 GHz |
| Switch Voltage[2,3]: | <10 V | <5 V |
| Impedance: | 50 ohm | 50 ohm |
| Elec, Connector: | SMA Connector (74A, 74B) | SMA Connector (74A, 74B) |
| Optical Connector[3]: | Micropositioner | Micropositioner |
| Extinction Ratio[3]: | >18 dB | Not measured |
| Insertion Loss[3]: | <5 dB | Not measured |

Comments: Tests to date indicate these devices are extremely resistant to optical damage.
[1]Small Signal Analysis, traveling wave electrode
[2]Lumped Test Electrode
[3]Fibers abutted to waveguide structure using micropositioners.

Those skilled in the art, having the benefit of the teachings of the present invention may impart numerous modifications thereto. It should be understood that such modifications are to be construed as lying within the contemplation of the present invention as defined by the appended claims.

What is claimed is:

1. In an electro-optic component having a housing with a dielectric waveguide structure disposed therein, the improvement comprising a mounting pedestal disposed between the housing and the dielectric waveguide structure, the pedestal being fabricated of a dielectric material, wherein the housing has a floor and a sidewall each of which is provided with a registered opening therein, wherein the pedestal is mounted on an L-shaped insert member having a first and a second leg, the leg of the insert having the pedestal thereon being received in the housing to close the opening in the floor thereon, with the other leg of the insert closing the opening in the sidewall of the housing.

2. The component of claim 1 wherein the dielectric material is dielectric microwave quartz.

3. In combination with a waveguide structure having a channeled waveguide pattern thereon, a mounting clip arrangement comprising:

a first and a second mounting element, each mounting element having a groove extending over a portion thereof, the first mounting element being abutted against the facet of the waveguide structure while the second mounting element overlies a portion of the waveguide structure, the first and second mounting elements being themselves overlaid such that the grooves therein cooperate to define a passage sized to receive the optical fiber therein, the optical fiber having a planar end face, the planar end face of the optical fiber lying in the passage a predetermined clearance distance from the facet of the waveguide structure, the end face of the fiber being aligned in a predetermined relationship with the channeled waveguide pattern.

4. An electro-optic waveguide structure having a $K_{1-x}Rb_xTiOMO_4$ single crystal substrate, wherein x is from 0 to 1 and M is P or As, having at least one smooth surface wherein sufficient cations have been replaced by ions selected from at least one of $Rb(+)$, $Cs(+)$ and $Tl(+)$ ions, with the proviso that when x is at least about 0.8, the replacement ions are selected from at least one one of $Cs+$ and $Tl+$ ions, the substrate having a bulk index of refraction associated therewith, wherein the improvement comprises the region wherein the cations have been replaced defining a single mode channeled waveguide pattern in the substrate, the channeled waveguide pattern having a configuration including a first portion and a second portion contiguous to and communicating with the first, each portion having an axis therethrough, the axes defining a predetermined angle therebetween, the channeled waveguide pattern having an inferred surface index of refraction that is increased with respect to the bulk index of refraction of the starting crystal substrate by at least 0.0045, whereby an optical wave having a predetermined initial power level launched into the first portion of the channeled waveguide pattern undergoes at least one change of direction as the optical wave passes from the first portion to the second portion of the channeled waveguide pattern with at least sixty-nine percent (69%) of the initial power level of the optical wave being transmitted through the change of direction.

5. The waveguide structure of claim 4 wherein the channeled waveguide pattern has an inferred surface index of refraction that is increased with respect to the bulk index of refraction of the starting crystal substrate by at least 0.012.

6. The waveguide structure of claim 5 wherein the channeled waveguide pattern extends into the substrate for a first predetermined distance and across the substrate for a second predetermined distance, each of the first and second distances being in the range from one-half (0.5) to ten (10) micrometers.

7. The waveguide structure of claim 6 having a buffer layer thereon, wherein the improvement further comprises the buffer layer has a height h in micrometers and a bulk index of refraction n associated therewith, wherein the bulk index of refraction of the buffer layer is less than the bulk index of refraction of the substrate by a number $\Delta n$, wherein the height h and the difference $\Delta n$ in the bulk indices of refraction are such that the product $$(h \bullet \Delta n)$$

lies in the range between 0.01 and 1.0 micrometers.

8. The waveguide structure of claim 6 having a buffer layer thereon, wherein the improvement further comprises the buffer layer is itself comprised of two or more strata of material each of which has a predetermined bulk index of refraction associated therewith, such that the buffer layer has a total height h' in micrometers and an effective bulk index of refraction n' associated therewith, wherein the effective bulk index of refraction of the buffer layer is less than the bulk index of refraction of the substrate by a number $\Delta n'$, wherein the height h' and the difference $\Delta n'$ are such that the product $$(h' \bullet \Delta n')$$

lies in the range between 0.01 and 1.0 micrometers.

9. The waveguide structure of claim 6 wherein the single crystal substrate is $KTiOPO_4$.

10. The waveguide structure of claim 9 wherein the $K(+)$ ions are replaced by $Rb(+)$ ions.

11. The waveguide structure of claim 4 wherein the channeled waveguide pattern extends into the substrate for a first predetermined distance and across the substrate for a second predetermined distance, each of the first and second distances being in the range from one-half (0.5) to ten (10) micrometers.

12. The waveguide structure of claim 11 having a buffer layer thereon, wherein the improvement further comprises the buffer layer has a height h in micrometers and a bulk index of refraction n associated therewith, wherein the bulk index of refraction of the buffer layer is less than the bulk index of refraction of the substrate by a number $\Delta n$, wherein the height h and the difference $\Delta n$ in the bulk indices of refraction are such that the product $$(h \bullet \Delta n)$$

lies in the range between 0.01 and 1.0 micrometers.

13. The waveguide structure of claim 11 having a buffer layer thereon, wherein the improvement further comprises the buffer layer is itself comprised of two or more strata of material each of which has a predetermined bulk index of refraction associated therewith, such that the buffer layer has a total height h' in micrometers and an effective bulk index of refraction n' associated therewith, wherein the effective bulk index of refraction of the buffer layer is less than the bulk index of refraction of the substrate by a number $\Delta n'$, wherein the height h' and the difference $\Delta n'$ are such that the product $$(h' \bullet \Delta n')$$

lies in the range between 0.01 and 1.0 micrometers.

14. The waveguide structure of claim 11 wherein the single crystal substrate is $KTiOPO_4$.

15. The waveguide structure of claim 14 wherein the $K(+)$ ions are replaced by $Rb(+)$ ions.

16. The waveguide structure of claim 4 having a buffer layer thereon, wherein the improvement further comprises the buffer layer has a height h in micrometers and a bulk index of refraction n associated therewith, wherein the bulk index of refraction of the buffer layer is less than the bulk index of refraction of the substrate by a number $\Delta n$, wherein the height h and the difference $\Delta n$ in the bulk indices of refraction are such that the product $$(h \bullet \Delta n)$$

lies in the range between 0.01 and 1.0 micrometers.

17. The waveguide structure of claim 4 having a buffer layer thereon, wherein the improvement further comprises the buffer layer is itself comprised of two or more strata of material each of which has a predetermined bulk index of refraction associated therewith, such that the buffer layer has a total height h' in micrometers and an effective bulk index of refraction n' associated therewith, wherein the effective bulk index of refraction of the buffer layer is less than the bulk index of refraction of the substrate by a number $\Delta n'$, wherein the height h' and the difference $\Delta n'$ are such that the product $$(h' \bullet \Delta n')$$

lies in the range between 0.01 and 1.0 micrometers.

18. The waveguide structure of claim 4 wherein the single crystal substrate is KTiOPO$_4$.

19. The waveguide structure of claim 18 wherein the K(+) ions are replaced by Rb(+) ions.

20. An electro-optic waveguide structure having a K$_{1-x}$Rb$_x$TiOMO$_4$ single crystal substrate, wherein x is from 0 to 1 and M is P or As, having at least one smooth surface wherein sufficient cations have been replaced by ions selected from at least one of Rb(+), Cs(+) and Tl(+) ions, with the proviso that when x is at least about 0.8, the replacement ions are selected from at least one one of Cs+ and Tl+ ions, the substrate having a bulk index of refraction associated therewith, wherein the improvement comprises:

the region wherein the cations have been replaced defining a single mode channeled waveguide pattern in the substrate, the channeled waveguide pattern having a configuration of the interferometric type, the configuration of the channeled waveguide pattern being an input portion which diverges into respective first and second input transition portions, each transition portion being contiguous to and communicating with respective first and second interaction portions, the interaction portions being separated by a predetermined distance sufficient to preclude evanescent optical field coupling therebetween, the first and second interaction portions being each contiguous to and communicating with respective first and second output transition portions which converge to an output portion, the input portion and the first and second input transition portions being generally linear and each having an axis therethrough, the axis of the input portion and each of the axes of the transition portions respectively defining a predetermined angle therebetween, the channeled waveguide pattern having an inferred surface index of refraction that is increased with respect to the bulk index of refraction of the starting crystal by at least 0.0045 whereby at least twenty-two percent (22%) of the initial power of an optical wave launched into the input portion is transmitted from the input portion to the output portion.

21. The waveguide structure of claim 20 wherein the improvement further comprises the channeled waveguide pattern has an inferred surface index of refraction that is greater than the bulk index of refraction of the starting crystal by at least 0.012; and wherein at least forty-two percent (42%) of the initial power level is transmitted from the input portion to the output portion.

22. The waveguide structure of claim 21 wherein the channeled waveguide pattern extends into the substrate for a first predetermined distance and across the substrate for a second predetermined distance, each of the first and second distances being in the range from one-half (0.5) to ten (10) micrometers.

23. The waveguide structure of claim 22 having a buffer layer thereon, wherein the improvement further comprises the buffer layer has a height h in micrometers and a bulk index of refraction n associated therewith, wherein the bulk index of refraction of the buffer layer is less than the bulk index of refraction of the substrate by a number $\Delta n$, wherein the height h and the difference $\Delta n$ in the bulk indices of refraction are such that the product $$(h \bullet \Delta n)$$

lies in the range between 0.01 and 1.0 micrometers.

24. The waveguide structure of claim 22 having a buffer layer thereon, wherein the improvement further comprises the buffer layer is itself comprised of two or more strata of material each of which has a predetermined bulk index of refraction associated therewith, such that the buffer layer has a total height h' in micrometers and an effective bulk index of refraction n' associated therewith, wherein the effective bulk index of refraction of the buffer layer is less than the bulk index of refraction of the substrate by a number $\Delta n'$, wherein the height h' and the difference $\Delta n'$ are such that the product $$(h' \bullet \Delta n')$$

lies in the range between 0.01 and 1.0 micrometers.

25. The waveguide structure of claim 22 wherein the single crystal substrate is KTiOPO$_4$.

26. The waveguide structure of claim 25 wherein the K(+) ions are replaced by Rb(+) ions.

27. The waveguide structure of claim 20 wherein the channeled waveguide pattern extends into the substrate for a first predetermined distance and across the substrate for a second predetermined distance, each of the first and second distances being in the range from one-half (0.5) to ten (10) micrometers.

28. The waveguide structure of claim 27 having a buffer layer thereon, wherein the improvement further comprises the buffer layer has a height h in micrometers and a bulk index of refraction n associated therewith, wherein the bulk index of refraction of the buffer layer is less than the bulk index of refraction of the substrate by a number $\Delta n$, wherein the height h and the difference $\Delta n$ in the bulk indices of refraction are such that the product (h•$\Delta n$)

lies in the range between 0.01 and 1.0 micrometers.

29. The waveguide structure of claim 27 having a buffer layer thereon, wherein the improvement further comprises the buffer layer is itself comprised of two or more strata of material each of which has a predetermined bulk index of refraction associated therewith, such that the buffer layer has a total height h' in micrometers and an effective bulk index of refraction n' associated therewith, wherein the effective bulk index of refraction of the buffer layer is less than the bulk index of refraction of the substrate by a number $\Delta n'$, wherein the height h' and the difference $\Delta n'$ are such that the product (h'•$\Delta n'$)

lies in the range between 0.01 and 1.0 micrometers.

30. The waveguide structure of claim 27 wherein the single crystal substrate is KTiOPO$_4$.

31. The waveguide structure of claim 30 wherein the K(+) ions are replaced by Rb(+) ions.

32. The waveguide structure of claim 20 having a buffer layer thereon, wherein the improvement further comprises the buffer layer has a height h in micrometers and a bulk index of refraction n associated therewith, wherein the bulk index of refraction of the buffer layer is less than the bulk index of refraction of the substrate by a number $\Delta n$, wherein the height h and the difference $\Delta n$ in the bulk indices of refraction are such that the product (h•$\Delta n$)

lies in the range between 0.01 and 1.0 micrometers.

33. The waveguide structure of claim 32 wherein the improvement further comprises a pair of electrodes arranged in a predetermined pattern with respect to the interaction portions of the channeled waveguide pattern such that the first electrode overlies the first interaction portion and the second electrode overlies the second interaction portion, the first electrode having a predetermined length dimension and a predetermined width dimension associated therewith, the width dimension varying along the length of the first electrode, the first electrode being spaced from the second electrode along the entire length of the first electrode to define a predetermined gap dimension therebetween.

34. The waveguide structure of claim 33 wherein the improvement further comprises:

the ratio of the width dimension of the first electrode along its length to the gap dimension along the same length being in the range 0.1 to 150, the first and second electrodes cooperating to define a traveling waveguide for microwave energy.

35. The waveguide structure of claim 33 wherein the improvement further comprises:

the ratio of the width dimension of the first electrode along its length to the gap dimension along the same length being in the range 0.8 to 113.

36. The waveguide structure of claim 32 wherein the improvement further comprises:

a pair of electrodes arranged in a predetermined pattern with respect to the interaction portion of the channeled waveguide pattern such that the first electrode overlies the first interaction portion of the waveguide pattern and the second electrode overlies the second interaction portion of the waveguide pattern, the first electrode having a predetermined width dimension associated therewith, wherein the width dimension is in the range from twenty to fifty micrometers.

37. The waveguide structure of claim 36 wherein the improvement further comprises:

an inductor element connecting in series with the first electrode.

38. The waveguide structure of claim 32 wherein the improvement further comprises:

a pair of electrodes arranged in a predetermined pattern with respect to the interaction portion of the channeled waveguide pattern such that the first electrode overlies the first interaction portion of the waveguide pattern and the second electrode overlies the second interaction portion of the waveguide pattern, the first electrode having a predetermined width dimension associated therewith, wherein the width dimension is in the range from five to twenty micrometers.

39. The waveguide structure of claim 38 wherein the improvement further comprises:

an inductor element connecting in series with the first electrode.

40. The waveguide structure of claim 20 having a buffer layer thereon, wherein the improvement further comprises the buffer layer is itself comprised of two or more strata of material each of which has a predetermined bulk index of refraction associated therewith, such that the buffer layer has a total height h' in micrometers and an effective bulk index of refraction n' associated therewith, wherein the effective bulk index of refraction of the buffer layer is less than the bulk index of refraction of the substrate by a number $\Delta n'$, wherein the height h' and the difference $\Delta n'$ are such that the product (h'•$\Delta n'$)

lies in the range between 0.01 and 1.0 micrometers.

41. The waveguide structure of claim 40 wherein the improvement further comprises a pair of electrodes arranged in a predetermined pattern with respect to the interaction portions of the channeled waveguide pattern such that the first electrode overlies the first interaction portion and the second electrode overlies the second interaction portion, the first electrode having a predetermined length dimension and a predetermined width dimension associated therewith, the width dimension varying along the length of the first electrode, the first electrode being spaced from the second electrode along the entire length of the first electrode to define a predetermined gap dimension therebetween.

42. The waveguide structure of claim 41 wherein the improvement further comprises:

the ratio of the width dimension of the first electrode along its length to the gap dimension along the same length being in the range 0.1 to 150, the first and second electrodes cooperating to define a traveling waveguide for microwave energy.

43. The waveguide structure of claim 41 wherein the improvement further comprises:

the ratio of the width dimension of the first electrode along its length to the gap dimension along the same length being in the range 0.8 to 113.

44. The waveguide structure of claim 20 wherein single crystal substrate is $KTiOPO_4$.

45. The waveguide structure of claim 44 wherein the $K(+)$ ions are replaced by $Rb(+)$ ions.

46. An electro-optic waveguide structure having a $K_{1-x}Rb_xTiOMO_4$ single crystal substrate, wherein x is from 0 to 1 and M is P or As, having at least one smooth surface wherein sufficient cations have been replaced by ions selected from at least one of $Rb(+)$, $Cs(+)$ and $Tl(+)$ ions, with the proviso that when x is at least about 0.8, the replacement ions are selected from at least one one of $Cs+$ and $Tl+$ ions, the substrate having a bulk index of refraction associated therewith, wherein the improvement comprises:

the region wherein the cations have been replaced defining a channeled waveguide pattern in the substrate, the waveguide having a configuration of the directional coupler type, the configuration of the channeled waveguide pattern having a first input portion and a second input portion which converge toward each other, each input portion being contiguous to and in communication with a respective first and second interaction portion; the interaction portions being spaced apart by a predetermined distance over some predetermined portion of their length sufficient to allow evanescent optical field coupling between the interaction portions, each input portion and its respective interaction portion being generally linear and having an axis therethrough, the axes of each input portion and its respective interaction portion defining a predetermined angle therebetween, the channeled waveguide pattern having an index of refraction that is greater than the bulk index of refraction of the starting crystal by at least 0.0045, whereby at least twenty-two percent (22%) of the predetermined initial power level of an optical wave launched into one of the input portions is transmitted into the associated interaction portion.

* * * * *